(12) United States Patent
Nakamura

(10) Patent No.: US 7,736,407 B2
(45) Date of Patent: Jun. 15, 2010

(54) HIGH ASPECT RATIO AND MULTI-CURVATURE SEPARATOR, AND HYBRID AIR CLEANER USING THE SAME

(75) Inventor: Masanobu Nakamura, Chofu (JP)

(73) Assignee: Nakamura Medicine and Engineering Research Institute Co., Ltd., Tokyo (JP)

( * ) Notice: Subject to any disclaimer, the term of this patent is extended or adjusted under 35 U.S.C. 154(b) by 0 days.

(21) Appl. No.: 12/216,275

(22) Filed: Jul. 2, 2008

(65) Prior Publication Data
US 2008/0264006 A1 Oct. 30, 2008

Related U.S. Application Data

(63) Continuation of application No. PCT/JP2006/300240, filed on Jan. 5, 2006.

(51) Int. Cl.
*B01D 50/00* (2006.01)
(52) U.S. Cl. .............................. 55/320; 55/424; 55/428; 55/434; 55/471; 55/DIG. 14
(58) Field of Classification Search ................. 55/337, 55/394, 396, 428, 434, 467, DIG. 14, 320, 55/424, 471; 96/222; 15/353
See application file for complete search history.

(56) References Cited

U.S. PATENT DOCUMENTS 1,838,117 A * 12/1931 Simms et al. ................. 55/393
2,221,385 A * 11/1940 Rogers ........................ 209/143
3,710,561 A    1/1973  Garrone
3,757,367 A    9/1973  Campbell
(Continued)

FOREIGN PATENT DOCUMENTS

JP           52-29277          8/1977

(Continued)

OTHER PUBLICATIONS

Kim. Wu J. and Patel. Virendra C.. "Origin and Decay of Longitudinal Vortices in Developing Flow in a Curved Rectangular Duct", J Fluids Engineering, V 116, p. 45. 1994.

(Continued)

*Primary Examiner*—Duane Smith
*Assistant Examiner*—Sonji Turner
(74) *Attorney, Agent, or Firm*—Bacon & Thomas, PLLC

(57) ABSTRACT

An inertial separator includes a main duct having a first half with high aspect ratio and positive curvature and a latter half with larger average curvature and an outside wall section removed; a part for sucking boundary layer formed on the side of the outside wall of the latter half with the section removed; a curved duct of a final collection part succeeding the part for sucking boundary layer, having a larger mean curvature and a smaller radial channel width than the latter half of the main duct, with an outside wall section removed; and a collection chamber part formed on a side of the outside wall of the curved duct with the section removed. A hybrid air cleaner combines the inertial separator with an air filter, removably having an allergen suction device sucking allergen from hair, bedding and so on, and a separated blowing mouth whereby the suspended allergen may be transported away during a patient's sleep.

12 Claims, 18 Drawing Sheets

U.S. PATENT DOCUMENTS

Figure 1:
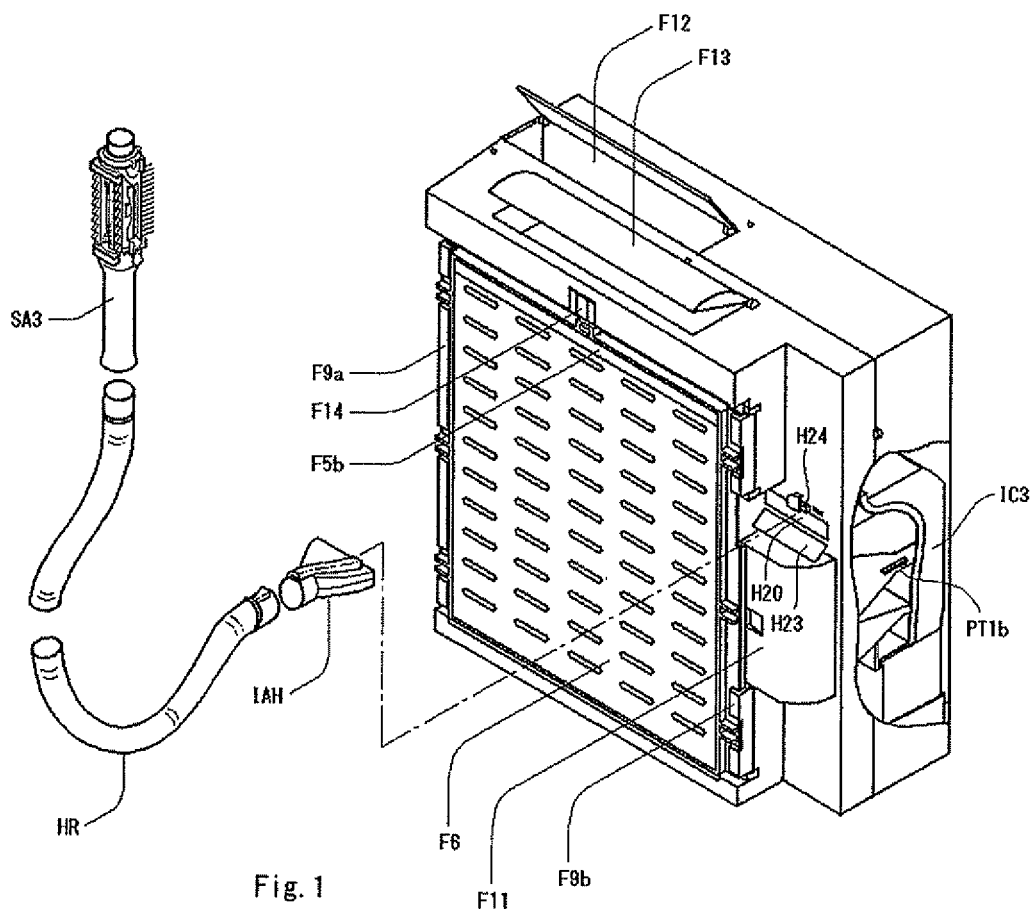

| | | | |
|---|---|---|---|
| 4,971,604 A | 11/1990 | Dockrell | |
| 2009/0044502 A1* | 2/2009 | Nakamura | 55/385.4 |

FOREIGN PATENT DOCUMENTS

| JP | 2006026338 A | * | 2/2006 |
|---|---|---|---|
| JP | 2006051494 A | * | 2/2006 |
| WO | WO 2007077631 A1 | * | 7/2007 |

OTHER PUBLICATIONS

International Search Report in PCT/JP2006/300240. Mar. 28, 2006.
Translation of International Preliminary Report on Patentability in PCT/JP2006/300240, Jul. 8, 2008.

* cited by examiner

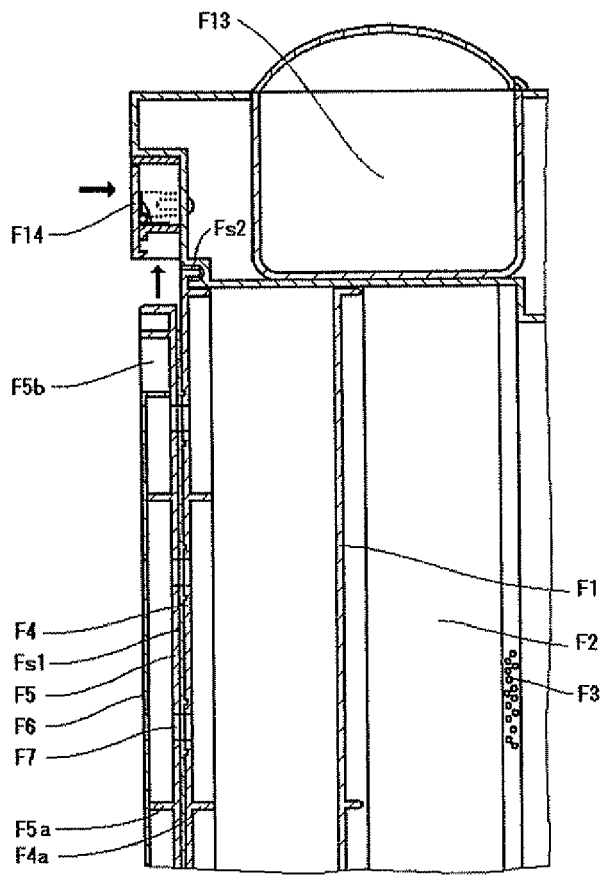
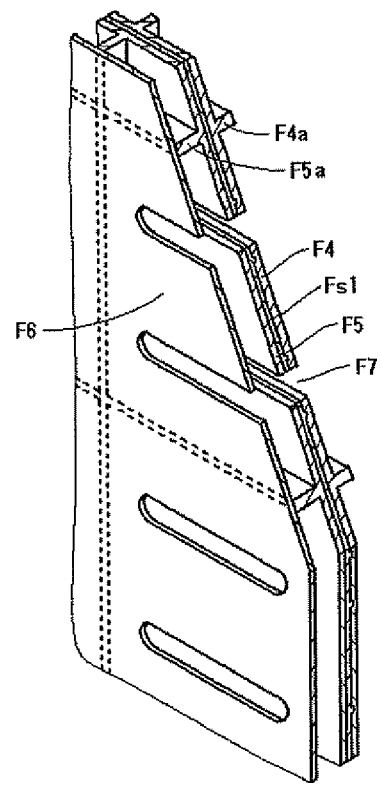
Fig. 3(b)
Fig. 3(a)

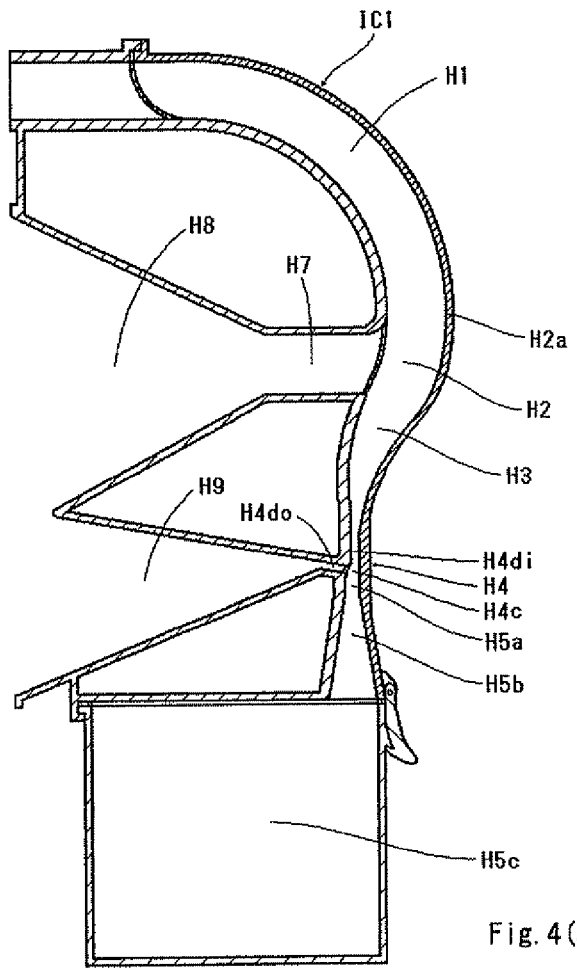
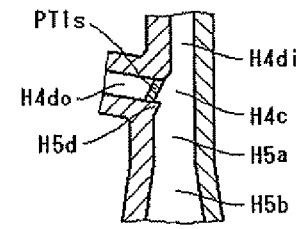
Fig. 4(b)
Fig. 4(a)
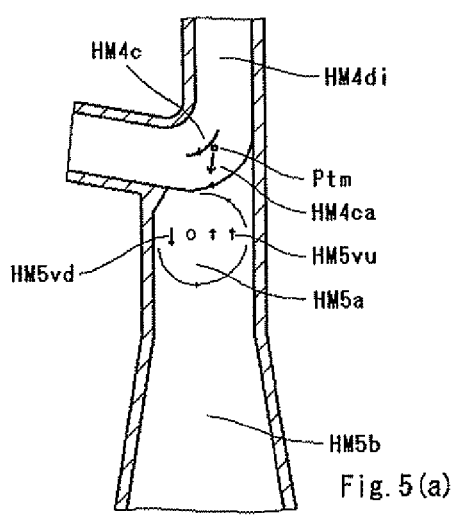
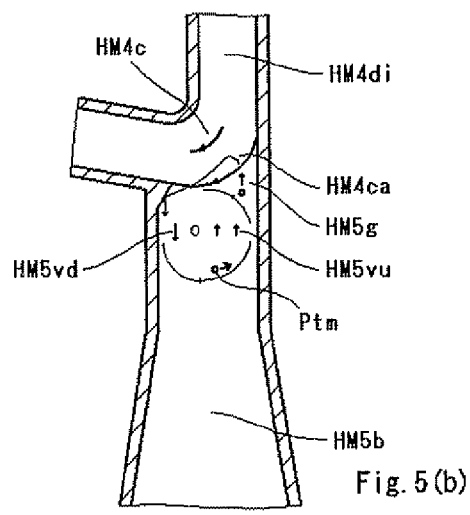
Fig. 5(a)    Fig. 5(b)

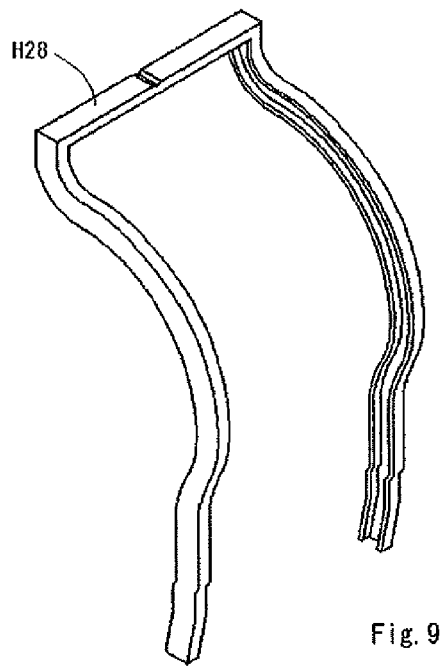
Fig. 9
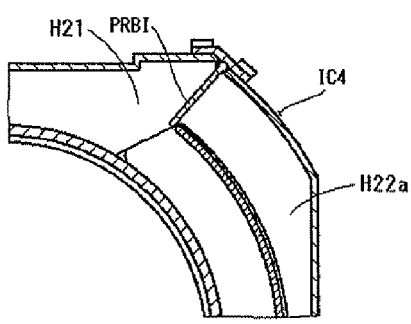 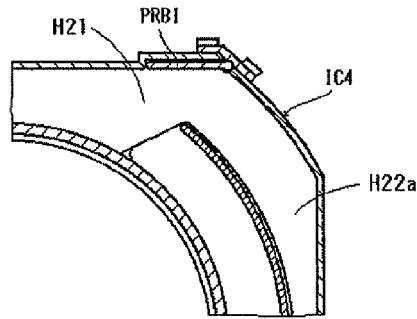
Fig. 10(a)   Fig. 10(b)
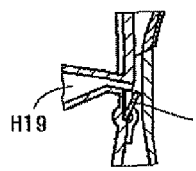 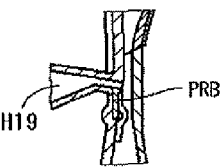 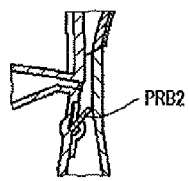 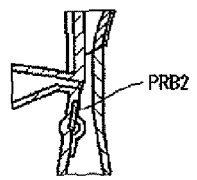
Fig. 11(a)   Fig. 11(b)   Fig. 11(p)   Fig. 11(q)

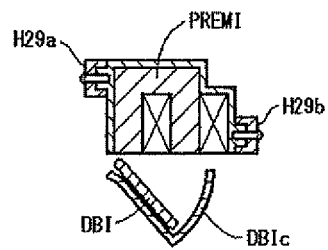 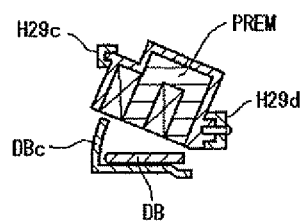
Fig. 13(a)　　　Fig. 13(b)
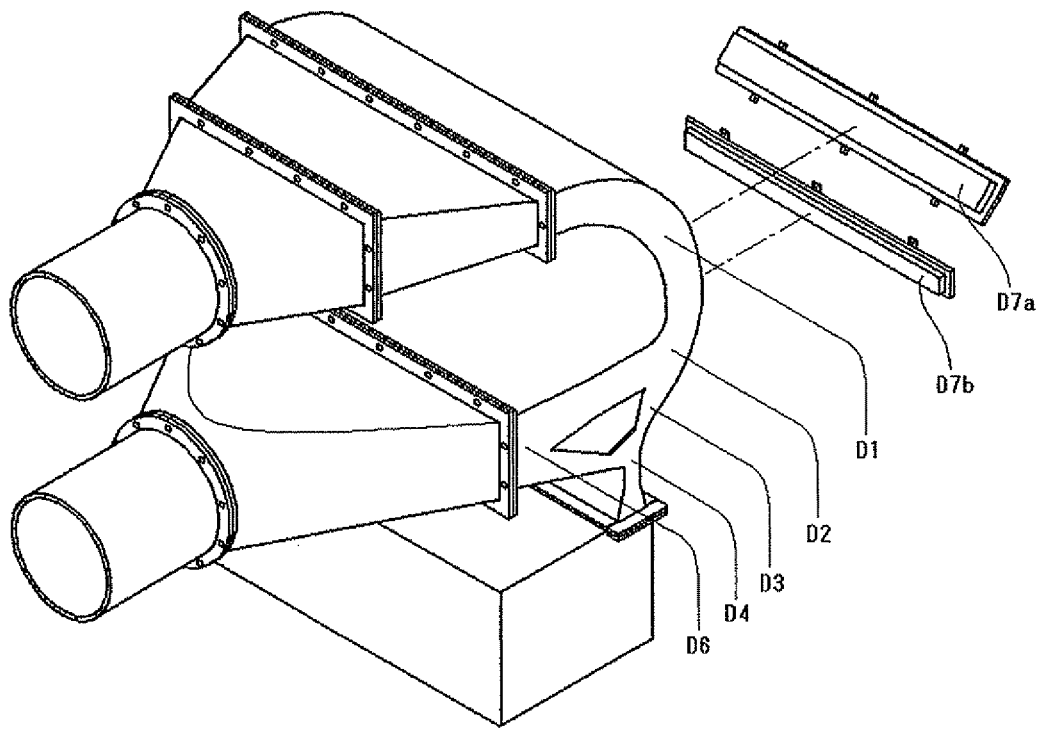
Fig. 14
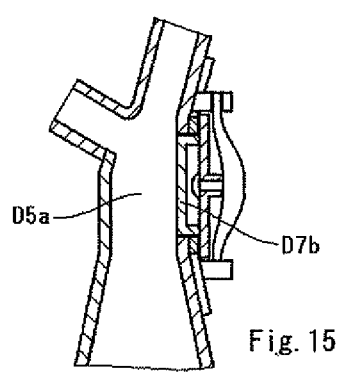
Fig. 15

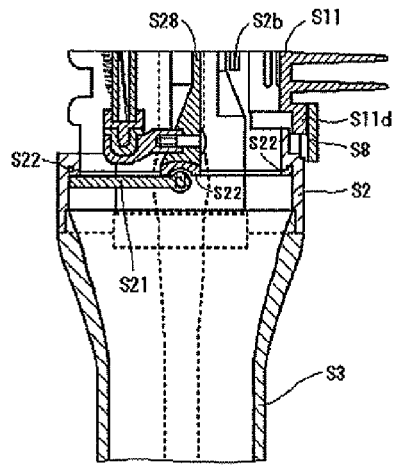
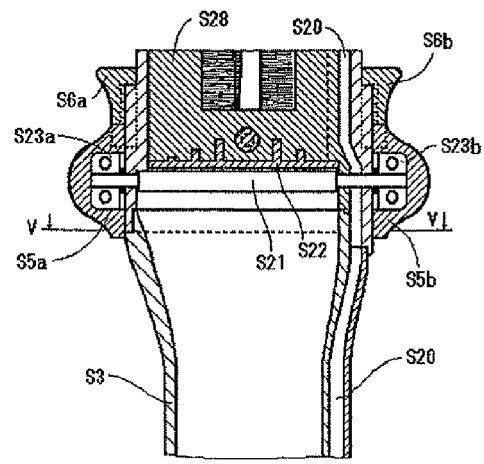
Fig. 22(a)    Fig. 22(b)
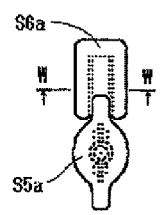
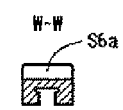
Fig. 23    Fig. 24(a)    Fig. 24(b)
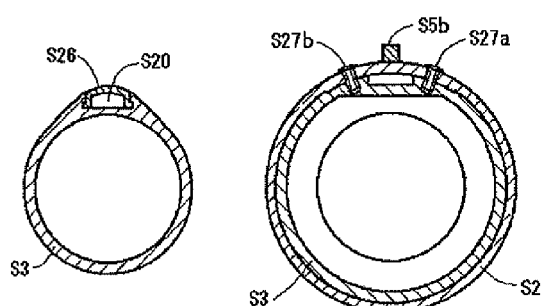
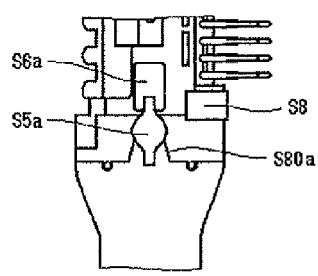
Fig. 25(a)    Fig. 25(b)    Fig. 26

HIGH ASPECT RATIO AND MULTI-CURVATURE SEPARATOR, AND HYBRID AIR CLEANER USING THE SAME

CROSS-REFERENCE TO RELATED APPLICATION

This application is a continuation application of PCT/JP2006/300240 designating the U.S., filed on Jan. 5, 2006, the entirety of which is incorporated herein by reference.

FIELD OF THE INVENTION

The present invention relates generally to an apparatus that collects airborne particles and particles adhering to objects, and in particular, relates to an inertial separator and a hybrid air cleaner that comprises the inertial separator and an air filter, removably having an allergen suction device.

BACKGROUND OF THE INVENTION

The increase of atopy and allergic disease is a global tendency, and 30 to 50% of the whole population are estimated to be atopic (non-patent ref. 1 which is listed hereinafter). The atopy indicates a condition wherein IgE is inclined to be generated against foreign antigens and Type 1 allergy is inclined to be caused. The typical diseases of Type 1 allergy are allergic rhinitis, allergic bronchial asthma and allergic conjunctivitis, which are caused by airborne particles containing antigen. Included among such airborne particles are, house dust whose important constituent is dust mites, and which is mentioned in a perennial case, and pollen which is mentioned in a seasonal case.

Perennial Allergic Rhinitis

Allergic disease shows a tendency of increasing and house dust mite allergy is recognized as a global health problem by WHO (non-patent ref. 1 below).

According to the allergy skin prick test among adults in south west London, the proportion of subjects with at least one positive reaction (that is the diameter of weal caused by grass pollen, house dust, or house dust mite antigens is larger than 1 mm), showed a significant increase from 23% ($312/1359$) in 1974 to 46% ($34/74$) in 1988 (non-patent ref. 2). According to the follow-up survey of the allergy skin test that was carried out on 1333 subjects aged 3 years and more, in Tucson, Ariz., during 8 years on average, the proportion of subjects with at least one positive reaction to plural antigens increased from 39.1[%] to 50.7% (non-patent ref. 3).

Furthermore, the proportion of the complicated cases of perennial allergic rhinitis and pollinosis is large. According to the postal questionnaire to adults aged 16 to 65 years in London, 55% of 1309 subjects with rhinitis had perennial symptoms only, 11% seasonal symptoms only, and 34% had the complicated symptoms of them (non-patent ref. 4).

In Japan, the estimated national prevalence of perennial allergic rhinitis in 1998 is 19.8%, and the estimated prevalence of Japanese cedar pollinosis is 17.3% (non-patent ref. 5). In addition, about 37% of perennial allergic rhinitis are in the complication of Japanese cedar pollinosis, which is based on the complication rate of these two allergic rhinitis by age groups, and others (non-patent ref. 6).

In perennial allergic rhinitis and allergic bronchial asthma, the dust mite allergen scattering from bedding is the matter of great concern. The dust mite allergen is contained in the fragments of the dead bodies and feces of mites. They break into particles with an aerodynamic diameter of over 1 or 2 μm and scatter (non-patent ref. 7). According to the example of measuring the aero-concentration of DerI and DerII as major allergens, the aero-concentration at the place near a sleeper's head and 30 cm high above a quilt is about 10 times as large as that at the place a little high above a usual floor (non-patent ref. 8). From the viewpoints of the length of sleeping hours and the situation in which the respiratory organs are close to bedding, it is understood how serious it is for the dust mite allergen to scatter from bedding.

Allergen exists in nightclothes also. The DerI concentration of the fine dust got from nightclothes is over 2 μg/g fine dust on average, which can induce allergic symptoms (non-patent ref. 9).

A Hybrid Air Cleaner

It is known that the symptoms of perennial allergic rhinitis are reduced if bedding is cleaned with a vacuum cleaner. However, it is hard to get into the habit of cleaning bedding with the vacuum cleaner of a floor movable type or a stick type. The vacuum cleaner of a handy type, which integrally has a motor and a paper dust pack, is too heavy to be easily handled.

Furthermore, although the dust mite allergen exists mainly inside bedding, cushions and others, rather than on the surface of these, removal of the inner allergen effectively with the existing vacuum cleaner has not been achieved.

The patient of perennial allergic rhinitis uses an air cleaner while sleeping, so it is useful that the air cleaner is equipped with a light allergen suction device and bedding is easily cleaned. In this case, dust sucked from bedding is too heavy a load for an air filter, so it is necessary to install a pre-collector which can collect comparatively large particles in upstream of the air filter.

As separators which collect comparatively large airborne particles, there are a cyclone, a multiclone, an inertial separator with a duct (for example, U.S. Pat. Nos. 3,710,561, 4,971,604 and Japanese Patent Examined Publication S52-29277) and a renewable filter, for example a wire mesh of stainless steel and so on.

Figure 41A:
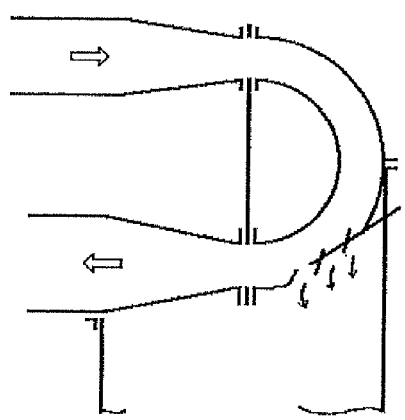

The apparatus disclosed in the U.S. Pat. No. 3,710,561, shown in FIG. 41(a), is a dust collector having a rectangular duct with continuous curvature and spanwise channel width larger than radial, and having an aperture on an outside adjacent to an outlet.

Figure 41B:
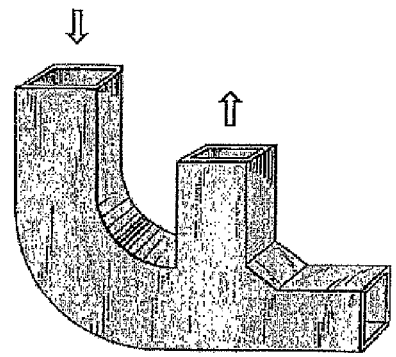

The apparatus disclosed in the U.S. Pat. No. 4,971,604, as shown in FIG. 41(b) removes mineral fibers that are pneumatically transported. A duct with a square or rectangular section is curved by 90° and an air flow passes through an exhaust portal, with particles getting to an output portal.

A representative dust collector is a cyclone or a multiclone comprising a plurality of cyclones in parallel. Although the collection efficiency of them is high, yet pressure loss is large. A tangential inlet cyclone is used usually at an inlet flow velocity of 7 to 15 m/s, and according to Iinoya's formula, the pressure loss of the above cyclone having a standard size ratio is about 240 to 1100 Pa with an outlet pipe open to the atmosphere (non-patent ref. 10).

Furthermore, a high-velocity swirling flow at an exit of the cyclone is extremely turbulent, which is not preferable for an input of a backward air filter.

Therefore, when the cyclone or the multiclone is used as a pre-collector upstream of the air filter, the suction power of the allergen suction device becomes weak. Furthermore, a household air cleaner is generally equipped with a fan whose wind flow rate is large and static pressure is low, so in a case where a flow to deal with by the allergen suction device ranges, the cyclone becomes unable to deal with a large flow.

Next, the method of separating particles from the air with a curved duct is described. Although the curved duct has the advantage that pressure loss is small, yet the collection efficiency of particles is not good owing to the turbulence of flow caused by centrifugal force.

When particles and so on are separated from the air by the curved duct with a circle or square section (for example, Japanese Patent Examined Publication S52-29277), a secondary flow, a velocity component, that is perpendicular to a direction of a main stream, develops, so the collection efficiency falls. The secondary flow is a phenomenon that is caused by the difference of a radial fluid thickness and the presence or absence of a sidewall friction.

The duct shown in FIG. 41(b) is also much affected by the sidewall friction. Furthermore, even if the duct is provided with a collection chamber at the output portal, particles separated from the air flow tend to re-scatter, because a collection mouth is wide.

On the other hand, in a curved rectangular duct with high aspect ratio, the effect of friction is restricted to the neighborhood of a sidewall and different flow phenomenons emerge over an outside concave wall and an inside convex wall. Concerning the stability and unstableness of a concentric flow, such things as the following are considered by persons, from Prandtl down (non-patent ref. 11).

When a fluid mass moves circularly at a radius y and with a velocity U, centrifugal force is balanced against pressure gradient. Therefore, let p and $\rho_a$ be pressure and air density, respectively, and $$\rho_a(U^2/y)=dp/dy$$

holds. Let $U_1$ and $U_2$ be the velocity at a radius $y_1$ and $y_2$, respectively. Now, when a fluid mass at the radius $y_1$ moves to be at the radius $y_2$ and the velocity $U_1$ becomes U', angular momentum is conserved like the next, $$\rho_a y_1 U_1 = \rho_a y_2 U'.$$

At this time, centrifugal force acting on the fluid mass having moved is $$\rho_a(U'^2/y_2)=\rho_a(y_1 U_1/y_2)^2/y_2.$$

If this value is smaller than the pressure gradient at the radius $y_2$, $\rho_a U_2^2/y_2$, that is $y_1 U_1 < y_2 U_2$, the turbulence goes toward restoration, with the result that the flow becomes stable. Conversely, the former is larger than the latter, that is $y_1 U_1 > y_2 U_2$, the turbulence goes toward increase, with the result that the flow becomes unstable. To be brief, in the concentric flow, when angular momentum radially increases, the flow becomes stable, and when angular momentum radially decreases, the flow becomes unstable.

In the curved rectangular duct with high aspect ratio, taking a radial distribution of a main stream velocity into consideration, a side to fulfill the stability condition that angular momentum increases is a convex wall side, and the one to become unstable is a concave wall side.

This is proved by the many experimental results of the past. In a boundary layer over a concave wall, there often occur Görtler vortices, the counter-rotating longitudinal vortex pairs whose axes are parallel to the direction of the main stream. The Görtler vortices are stationary longitudinal vortices that occur in a transition process from a laminar flow to a turbulent flow in the boundary layer, and it is also observed in a turbulent boundary layer. It is difficult to predict the occurrence of the Görtler vortices. The occurrence is much influenced by an overall apparatus configuration and turbulence at an entrance, and the vortices occur in some cases and do not occur in other cases. Even if the stationary vortices do not occur, the turbulence over the concave wall, which is caused by centrifugal force, is large.

To the contrary, a turbulent flow is further suppressed over the convex wall, which has been made clear by (a) a flow visualization with a smoke wire method and (b) the measurement of turbulent energy (non-patent ref. 12, non-patent ref. 13).

When particles are separated from the air flow by a curved rectangular duct with high aspect ratio, a flow turbulence over the concave wall of a duct like FIG. 41(a) is large, so a particle separation efficiency is not good. In addition, a plurality of prominent blades themselves disturb the current. Further, in this apparatus, even if it is equipped not with plural collection mouths but a single narrow collection mouth, the collection efficiency is low. Further, even if it is equipped with a wide collection mouth, the collection efficiency is not good because of the re-scattering of collected dust.

The above is the major problem wherein particles are inertially collected from the air with the duct.

Furthermore, the conventional inertial dust collector with the duct has a problem wherein a particle with large inertia and unfixed form tends to escape. When the diameter or velocity of a particle increases, which means a particle inertia increases, the particle property of following a current decreases and that of moving straight increases. In addition, a particle with a non-spherical or unfixed form irregularly bounces on a wall surface. For that reason, in the duct shown in FIG. 41(a), such particles tend to pass over the collection part. In the duct shown in FIG. 41(b), particles, which somewhat obliquely enters from an inlet, bounce on an outside wall, occasionally escaping. The phenomenon that hard coarse particles bounce on the wall surface and escape is observed in the cyclone also. The reason why the collection efficiency of the cyclone with a cylinder diameter less than 100 mm does not necessarily progress is believed to be due to the bounce of particles on the wall surface (non-patent ref. 14). Because an air filter is used downstream in a hybrid air cleaner, such particles that have escaped become the load of the air filter in full.

Next, a case where a renewable filter is used is described. When the renewable filter is used, collected dust is accumulated according to the use with the result that the suction power of the allergen suction device falls. Further, it has the problem of quickening the degradation of a deodorizing filter because the flow passes through the collected dust. In addition, it has a non-sanitary aspect where unwanted bacteria breed according to the temperature and humidity after water washing.

Furthermore, when particles with a diameter smaller than 20 μm are collected by the wire mesh of stainless steel, pressure loss gets large. The typical weaving patterns of wire meshes are plain weave, twill weave and twill Dutch weave. The plain or twill weave is the weaving pattern where every warp or weft is woven with separation. Although its pressure loss is small, a minimum aperture is 20 μm. The twill Dutch weave is the weaving pattern where wefts touch each other and a small wedge-shaped aperture, which is made up of a warp and a weft, plays a part as a filtering hole. Although its minimum filtering diameter can be under 20 μm, the pressure loss is large. The pressure loss of the twill Dutch wire mesh with a filtering diameter of 20 μm is 6 to 7 times larger than the twill wire mesh with a aperture of 20 μm. In bedding and so on, particles with a diameter smaller than 20 μm, which settled from atmospheric aerosol, are much contained. Pressure loss gets large when the twill Dutch wire mesh is used.

By the way, in a season when pollen scatters, pollen which adhered to hair or clothes during the patient's outdoor stay is carried indoors, and it re-scatters from them also. Pollen which re-scatters from hair passes in the neighborhood of the patient's eyes and/or respiratory organs, easily inducing allergic symptoms. The number of female patients with Japanese cedar pollinosis, aged 10 to 49 years, is greater than that of male patients (non-patent ref. 2, non-patent ref. 15). Woman's hair is so long and rich that pollen tends to adhere to it and go deep into it. Further, pollen which has invaded indoors and deposited on a sofa, bedding and so on, re-scatters from them during their use, inducing allergic symptoms. It is desirable to remove such pollen effectively, but a method or an apparatus for it is not presented.

Lastly, air blowing and circulation is mentioned. Although a conventional air cleaner circulates and purifies an air of a whole room, yet to remove the allergen suspending near the respiratory organs of the patient of perennial allergic rhinitis during his or her sleep, which is most important for the patient not sufficiently done.

LIST OF PATENT DOCUMENTS

1) U.S. Pat. No. 3,710,561
2) U.S. Pat. No. 4,971,604
3) Japanese Patent Examined Publication S52-29277

LIST OF NON-PATENT DOCUMENTS

1) Makino S(superv.): Global Strategy of Asthma Control and Prevention, *NHLBI/WHO Workshop Reports*, p 31, International Medical Publisher, LTD., Tokyo, 1995.
2) Sibbald B, Rink E: Is the Prevalence of Atopy Increasing?, *Bri. J. Gen. Practice,* 40, 338, 1990.
3) Barbee R A, Kaltenborn W, et al.: Longitudinal Changes in Allergen Skin Test Reactivity in a Community Population Sample, *J. Allergy Clin. Immunol.,* 79, 16, 1987.
4) Sibbald B, Rink E: *Epidemiology of Seasonal and Perennial Rhinitis; Clinical Presentation And Medical History, Thorax,* 46, 895, 1991.
5) Nakamura A, Asai T, et al.: Epidemiological National Survey of Allergic Rhinitis, *Trans. Oto-Rhino-Laryn. Soc. Japan,* 105, 215, 2002.
6) Baba K, Nakamura A: Epidemiology of Japanese Pollinosis and Perennial Allergic Rhinitis, *Allergology,* 15, 84, 2003.
7) Yoshizawa S, Sugawara F, et al.: Kinetics of the Falling of Airborne Mite Allergens (DerI and DerII), *Allergy,* 40(4), 435, 1991.
8) Sakaguchi M, Inouye S, et al.: Concentration of Airborne Mite Allergens (DerI and DerII) During Sleep, *Allergy,* 47, 55, 1992.
9) Enomoto T: Allergic Rhinitis and Environmental Control, *Progress in Medicine,* 22(2), 343, 2002.
10) The Japan Society of Mechanical Engineers edit.: The Handbook of Mechanical Engineering, The Part of Engineering, C8, C8-22, *The Japan Society of Mechanical Engineers,* Tokyo, 1989.
11) Prandtl L: Effect of Stabilizing Forces on Tubulence, *NACA TM*-625 (Translation of "Vortrage aus dem Gebiete der Aerodynamik und verwandter Gebiete"), Aachen, 1929.
12) Shizawa T, Shirai H, et al.: The Study of Longitudinal Vortices in the Turbulent Boundary Layer Over a Concave Wall, *JSME Inter. J.* (pt B), 50, 51, 1984.
13) Kim W J, Patel V C: Origin and Decay of Longitudinal Vortices in Developing Flow in a Curved Rectangular Duct, *J. Fluids Eng.,* 116, 45, 1994.
14) Iinoya K: Engineering of Dust Collection, p. 98, *The Nikkan Kogyo Shinbun, LTD.*, Tokyo, 1980.
15) Tanaka A, Iwase A, et al.: Epidemiology of Japanese Cedar Pollinosis—from the questionnaire survey on Mibuchou—, Trans. Oto-Rhino-Laryn. Soc. Japan, 102, 35, 1999.

SUMMARY OF THE INVENTION

In view of the foregoing, it is an object of the invention to provide an inertial separator which has low pressure loss and high collection efficiency.

Another object of the invention is to provide a hybrid air cleaner, comprising the inertial separator and the air filter, which can strongly and efficiently suck the dust mite allergen from bedding, nightclothes and so on, and can suck pollen adhering to hair, clothes, bedding, sofas and so on.

Another object of the invention is to provide the hybrid air cleaner, wherein the load of the air filter is small.

A further object of the invention is to provide the hybrid air cleaner which can efficiently transport airborne particles during a patient's sleep.

A first inertial separator of the invention is the one which comprises (a) a main duct having a first half and a latter half, the first half, having a positive curvature and a spanwise channel width larger than a radial channel width, the latter half, having a similar aspect ratio and a mean curvature larger than the first half with an outside wall part removed, (b) part for sucking a boundary layer formed on a side of a removed part of an outside wall of the latter half, (c) a final collection part succeeding the part for sucking the boundary, the final collection part, having an inlet duct, an outlet duct and a curved duct formed between the inlet duct and the outlet duct, the curved duct, having a larger mean curvature and a smaller radial channel width than the latter half of the main duct, with an outside wall part removed, and (d) a collection chamber part formed on a side of a removed part of an outside wall of the curved duct of the final collection part; and wherein two ducts succeeding the latter half of the main duct and the outlet duct of the final collection part are connected.

Based on a curved duct with a rectangular cross section, the first inertial separator separates particles from the air flow. A rectangle is got from (a) a plane perpendicular to a central flow path of the duct and (b) an inside surface of the duct. One side of the rectangle is parallel to a plane containing the central flow path of the duct and a length of the one side defines a radial channel width. Another side of the rectangle is perpendicular to said plane and a length of the another side defines a spanwise channel width. Here, the central flow path of the duct is defined as a smooth line that is got from a plurality of overlapped pixels of two advancing edges, when an inside line and an outside of a flow path in a plane being equidistant from both sides of the duct are morphologically dilated to a normal direction in the flow path, respectively. Further, an aspect ratio of the duct is defined as a ratio of the spanwise channel width to the radial channel width. Further, a curvature of the duct means a curvature of the central flow path of the duct. When a length of the central flow path is set to an independent variable and the curvature of the central flow path to a dependent variable, the mean curvature of the duct is defined as an integral value of the curvature with the length, divided by a whole length. Further, the outside wall of the latter half of the main duct may be partially or wholly removed and the outside wall of the curved duct of the final collection part may also.

Because the flow is stable over the convex wall as described above, a particle with a diameter of marginal collection is biased to the center of the flow at the exit of the first half of the main duct. In the duct with high aspect ratio, the static pressure becomes high and the main stream velocity becomes low over the concave wall because of centrifugal force. To the contrary, the former becomes low, the latter high over the convex wall, so it is further convenient to separate particles from the air in a stable flow over the convex wall. Next, said particle escapes from a main flow in the latter half of the main duct with a larger mean curvature than the first half. Even if the outside wall of the latter half is widely removed and equipped with a collection chamber part thereon, the collection efficiency is not good. The reasons are (a) the disturbance of flow over the concave wall of the main duct is large, (b) a particle that escaped from the main flow has a small entrance angle to the air of the collection chamber part, so the depth of penetration is shallow, and (c) an open area of the collection chamber part is large, so collected dust tends to re-scatter. Further, even if a wall with a larger radius of curvature than a removed outside radius of curvature of the latter half is formed and the separator is equipped with a collection chamber part succeeding said wall, the collection efficiency is not good because of (a) vortices generated at a stagnant zone between a mouth of the latter half and said wall, and (b) bounce of the particles on said wall. Therefore, the stagnant zone or a largely disturbed air flow over the concave wall of the main duct is sucked and introduced to the final collection part, at the curved duct of which the particles are separated from the air flow. The curved duct of the final collection part has a narrow channel width and a large curvature, and in addition the disturbance of flow is small. The particle that escaped from the current of the curved duct of the final collection part has a large entrance angle relative to the air of the collection chamber part, so the particle can penetrate deep into the air of the collection chamber part. Further, because the open area of the collection chamber part is small, the already collected dust does not tend to reach the final collection part. Even if said dust reaches the final collection part, said dust tends to come back again by the current in the curved duct of the final collection part with the large curvature and a small disturbance. Furthermore, the part for sucking the boundary layer has a high static pressure because of centrifugal force, so it is convenient to suck the air flow over the concave wall of the main duct.

It is preferable that (a) a main duct aspect ratio of the spanwise channel width to the radial is over 3, (b) in the first half of the main duct, a ratio of an inside radius of curvature to an outside is 3:4 to 5:6, (c) in the latter half of the main duct, a ratio of the inside radius of curvature to the removed outside radius of curvature is 1:4 to 1:2, (d) both the inlet and outlet ducts of the final collection part are straight, and (e) in the curved duct of the final collection part, the radial channel width is 1:10 to 1:5 of that of the latter half of the main duct and the ratio of the inside radius of curvature to the removed outside radius of curvature is under 1:2.

A suction flow rate of the boundary layer of the main flow or the air flow over the concave wall of the main duct is about 10 to 20% of a whole flow rate. When the two ducts succeeding the latter half of the main duct and the outlet duct of the final collection part join, a plurality of diffusers are usually used and the suction flow rate is controlled by a largeness of a spreading angle, a cross-sectional area and so on of the diffusers.

It can be considered that the main duct and the part for sucking the boundary layer has a function of concentrating the air containing the particles. Although the final collection part is formally similar to a virtual impactor used in an aerosol sampling, the inventive inertial separator can reduce the spanwise length of the duct extremely, compared with a case where the whole air flow is handled by the duct similar to the virtual impactor.

The first inertial separator is configured like above-described and functions like the following in sum, (a) the particle with the diameter of marginal collection is biased to the center of the flow by the stable flow over the convex wall of the first half of the main duct, escaping from the main flow in the latter half with the larger curvature than the first half, (b) the largely disturbed air flow over the concave wall of the main duct is sucked at the part for sucking the boundary layer, and (c) the particles are separated at the curved duct of the final collection part with a small disturbance and the largest curvature, whose open area to the collection chamber part is small. Therefore, the inventive inertial separator has low pressure loss, compared with the tangential inlet cyclone or the multiclone, and has high collection efficiency, compared with the conventional inertial dust collectors.

In addition, a radius of curvature of an inside wall of the latter half of the main duct may be zero, that is, an inside wall of the first half and an inside wall of the duct succeeding the latter half may be connected directly. A radius of curvature of an inside wall of the curved duct of the final collection part may also be zero. Further, the inside wall and an outside wall of the latter half of the main duct may be partly plane. The inside wall and an outside wall of the curved duct of the final collection part may be partly plane also.

In addition, the two ducts succeeding the latter half of the main duct and the outlet duct of the final collection part can be independent.

In addition, it is known that when a riblet is formed on the concave wall of the duct with high aspect ratio, the Görtler vortices are suppressed or develop according to a variation of a stream velocity. Further, when a plurality of grooves are formed, dust tends to adhere to the grooves.

A second inertial separator of the invention is the first inertial separator, wherein (a) a portion of a wall of an upper part of the collection chamber part is formed by a plate for preventing re-scatter externally connecting with a driving plate made of ferromagnetic material, (b) the plate for preventing re-scatter closes the upper part of the collection chamber part, while inertial collection is not performed, and (c) the plate for preventing re-scatter opens the upper part of the collection chamber part with an electromagnet for preventing re-scatter attracting the driving plate, while inertial collection is performed.

The upper part of the collection chamber part is opened only while inertial collection is performed, which prevents the already collected dust from re-scattering owing to an apparatus vibration caused by a motor and so on while inertial collection is not performed.

A third inertial separator of the invention is the first inertial separator, wherein an initial collection mouth is opened at an initial part of a curve of an outside wall of the first half of the main duct and a part with an initial collection chamber is formed connecting to the initial collection mouth.

As a particle diameter or stream velocity gets large, which means a particle inertia increases, the linearity of particle motion in the air flow strengthens. Further, a particle with an unfixed form tends to bounce irregularly on a wall surface. In the first inertial separator, even if a particle with a small inertia bounces on the wall surface, the collection efficiency is good because of the tendency of the particle to follow the air flow. However, a particle with a large inertia and an unfixed form tends to bounce irregularly on the wall surface ranging from an outlet of the first half to an inlet of the latter half and to escape. Therefore, the outside wall of the initial part of the curve of the first half is removed, so that the particle with the large inertia and the unfixed form coming straight from an inlet is led to the part with the initial collection chamber and removed from the main duct in advance.

Such particles are contained in soil particles or road dust scattering in the atmosphere, and more invade indoors depending on a locating condition of a house, a location of a room, a time length of opening windows, and so on.

Further, it is preferable that the separator is provided with a straight inlet duct with a similar aspect ratio before the first half.

In the third inertial separator, the particle with the large inertia and the unfixed form, coming straight from the inlet, is removed at the initial collection mouth, so the collection efficiency of said particle does not drop.

A fourth inertial separator of the invention is the third inertial separator, wherein (a) an upper part of the part with the initial collection chamber is equipped with a plate for preventing initial re-scatter which externally connects with a driving plate of initial collection made of ferromagnetic material, (b) the portion of the wall of the upper part of the collection chamber part is formed by the plate for preventing re-scatter externally connecting with the driving plate made of ferromagnetic material, (c) the plate for preventing initial re-scatter and the plate for preventing re-scatter close the upper part of the part with the initial collection chamber and the upper part of the collection chamber part, respectively, while inertial collection is not performed, and (d) the plate for preventing initial re-scatter and the plate for preventing re-scatter open the upper part of the part with the initial collection chamber and the upper part of the collection chamber part, respectively, with an electromagnet for preventing initial re-scatter and the electromagnet for preventing re-scatter attracting the driving plate of initial collection and the driving plate, respectively, while inertial collection is performed.

The upper parts of the collection chamber part of initial collection and the collection chamber part are opened only while inertial collection is performed, which prevents the already collected dust from re-scattering owing to the apparatus vibration caused by the motor and so on while inertial collection is not performed.

The inventive inertial separator may be referred to as the high Aspect Ratio and Multi-Curvature (HARMUC) separator or HARMUC.

A first hybrid air cleaner of the invention comprises: (a) a filter collection part having a pre-filter, a filter medium and a deodorizing filter, (b) a centrifugal fan behind the filter collection part, (c) a suction control part before the filter collection part, with a suction plate and a plate for adjusting a plurality of suction holes, the suction plate and the plate for adjusting the suction holes, both of which, having the suction holes, let the air flow pass or stop by relatively shifting. (d) any inertial separator of the first inertial separator to the fourth with a plate for opening and closing of an inlet, (e) a connection part for the inertial separator, connecting an outlet of the inertial separator and a space formed between the filter collection part and the suction control part, (f) a hose having a suction air path, and (g) any of a first, second, third and fourth allergen suction device, whose detail is described below, removably attached to the inertial separator via the hose and an inertial separator adapter having a hose connection part.

The first allergen suction device removably attached to the first hybrid air cleaner, comprises a wide suction mouth on a body of the device and the hose connection part at an end. The first allergen suction device mainly sucks the dust mite allergen from bedding.

The second allergen suction device is the first allergen suction device, further comprising (a) a vibrating brush with a plurality of suction holes of a brush plate, (b) a flow path bulkhead separating the wide suction mouth and the vibrating brush, (c) a driving motor supported on an upper plate of the body of the device, arranged to vibrate the vibrating brush lengthwise, (d) a plurality of suction holes in a vibrating brush side, and (e) a plate for flow path change, at a lower part of the flow path bulkhead.

The second allergen suction device mainly sucks pollen from hair and the dust mite allergen from bedding. Because the vibrating brush vibrates lengthwise, pollen is effectively sucked from hair. Further, because the suction holes of the vibrating brush side are open on the body of the device, pollen moving apart from a bundle of hair to an outer space owing to a vibration of the vibrating brush is sucked.

The third allergen suction device is the first allergen suction device, further comprising (a) the vibrating brush with the suction holes of the brush plate, (b) a rotating brush in the wide suction mouth, (c) the flow path bulkhead separating the wide suction mouth and the vibrating brush, (d) a claw for a suction mode of the rotating brush, a claw for a suction of the rotating brush and a claw stopper, the two claws, formed on an edge of an upper body of the device being able to slide, either of which is fixed by the claw stopper, selecting one of the two suction modes correspondingly, (e) a driving motor contained in the upper body of the device, the driving motor rotating the rotating brush about an axis or vibrating the vibrating brush lengthwise, according to selection of one of the two suction modes, (f) a switch arranged to detect a position of the claw stopper, the switch detecting the claw stopper moving downwards in a change mode, which causes the driving motor to be driven in a low torque and the suction mode to be smoothly changed, (g) the suction holes in a vibrating brush side, and (h) the plate for flow path change, at the lower part of the flow path bulkhead.

The third allergen suction device has the two suction modes and the change mode. The former are the vibrating brush suction mode and the rotating brush suction mode, and the latter is a mode for changing the two suction modes. The third allergen suction device sucks pollen from hair in the suction mode of the vibrating brush, and sucks pollen and the dust mite allergen from clothes, sofas, bedding and so on in the suction mode of the rotating brush. Because the third allergen suction device has the rotating brush, pollen is effectively sucked from clothes, sofas, bedding and so on.

Further, when a user moves the claw stopper downward and slides the upper body of the device to change the suction mode, occasionally a plurality of gears do not mesh. Therefore, in the third allergen suction device, a downward movement of the claw stopper is detected by the switch for detecting the position of the claw stopper with a sliding form, and the driving motor is driven in the low torque, smoothly changing the suction mode.

The fourth allergen suction device is the first allergen suction device, further comprising (a) an outer body of the device having a plurality of suction mouths in the outer body and a cover which can slide to open and close the suction mouths, (b) an inner body supported by the outer body with a flow path formed between the inner body and the outer body for suction air sucked from the suction mouths of the outer body, (c) a driving motor contained in the inner body and one or two beating members projecting from a base of the inner body, the one or two beating members, reciprocated by the driving motor, and (d) an adapter for a quilt, the adapter having a plurality of meshlike suction mouths and being removably attached.

The fourth allergen suction device has the wide suction mouth and the one or two beating members, mainly for sucking dust mite allergen from bedding. The beating members continually beat a comparatively hard bedding, that is, a mattress, a pillow and so on, and the allergen that is scattered is sucked. When the beating members are reciprocated, a bed sheet around the device is stretched, with the allergen scattering in a surrounding area. Therefore, the surrounding air is sucked at a large flow rate, passing through the suction mouths of the outer body of the device. When the allergen is sucked from a comparatively soft and highly permeable quilt, the user slides the cover to close the suction mouths of the outer body of the device and attaches the adapter for the quilt with meshlike suction mouths. Next the allergen is sucked with the adapter suppressing the quilt from sticking to the wide suction mouth.

In the fourth allergen suction device, because the beating members continually beat the mattress, the pillow and so on and the allergen having scattered is sucked, the dust mite allergen existing in an inner part of bedding is effectively removed, compared with a case of simply sucking from such bedding.

The above is about the allergen suction device. In the first hybrid air cleaner, when room air is cleaned, the suction holes of (a) the suction plate and (b) the plate for adjusting the suction holes, are arranged in order, with the plate for opening and closing of the inlet closed, so room air is sucked from the suction holes. When the allergen is directly sucked and removed, the operation is as follows: (a) the suction plate and the plate for adjusting the suction holes are mutually shifted, closing the suction holes, (b) the plate for opening and closing of the inlet is opened, (c) any of the first allergen suction device to the fourth is attached to the inertial separator via the hose and the inertial separator adapter, and (d) the centrifugal fan and any of the first allergen suction device to the fourth are operated.

In addition, a plurality of electric wires of the driving motor and so on are connected at a terminal of the hose connection part.

Because the first hybrid air cleaner has any of the first allergen suction device to the fourth removably attached, the patient of perennial allergic rhinitis can easily suck and clean the allergen from bedding or nightclothes, besides cleaning room air, compared with a conventional case where bedding is cleaned by the vacuum cleaner.

Because the first hybrid air cleaner is provided with the inventive inertial separator, the suction power of the allergen suction device is strong as compared with a conventional cyclone or multiclone, and the load of the air filter is small as compared with a conventional inertial separator with the duct.

Because the first hybrid air cleaner is provided with the inventive inertial separator, an initial suction power of the allergen suction device is strong as compared with a wire mesh of stainless steel. Furthermore, because the air flow does not pass through the collected dust, a rise of the pressure loss and a fall of the suction power before the air filter according to usage does not occur. Furthermore, the degradation of a collecting member and the breeding of unwanted bacteria according to a water wash does not occur and the degradation of the deodorizing filter does not quicken.

Further, the first hybrid air cleaner with the second inertial separator or the fourth prevents the collected dust re-scattering because of the vibration of the motor while cleaning room air, and reduces the load of the air filter.

Further, the first hybrid air cleaner with the third inertial separator or the fourth prevents particles which have large inertia and unfixed form, like soil particles with large diameter, from escaping and loading the air filter.

Because the first hybrid air cleaner with the second allergen suction device attached has the vibrating brush, pollen is effectively sucked and removed from hair.

Because the first hybrid air cleaner with the third allergen suction device attached has the vibrating brush, pollen is effectively sucked and removed from hair. Further, because the first hybrid air cleaner has the rotating brush, pollen is effectively sucked and removed from clothes, sofas, bedding and so on.

As for the first hybrid air cleaner with the fourth allergen suction device attached, the beating members continually beat a mattress, pillow and so on, and the allergen having been scattered is sucked, so dust mite allergen existing in the inner part of bedding is effectively removed, as compared with simply sucking from bedding. Furthermore, because the first hybrid air cleaner is provided with the inventive inertial separator, the allergen having scattered in the surrounding area is sucked at a large flow rate, as compared with a case where the cyclone or multiclone cannot afford a sufficient flow rate.

Furthermore, the first hybrid air cleaner, further comprises a plurality of ferromagnetic materials for tight closure at an edge of the plate for adjusting the suction holes and a plurality of electromagnets for tight closure held by a body of the hybrid air cleaner or the connection part for the inertial separator; and wherein the electromagnets are energized and attract the ferromagnetic materials, while any of the first allergen suction device to the fourth is operating, to automatically increase the airtightness between the suction plate and the plate for adjusting the suction holes.

(C) A Second Hybrid Air Cleaner

A second hybrid air cleaner of the invention is the first hybrid air cleaner, wherein (a) the hose further comprises a blowing air path and (b) the hose connection part fits with the hose and makes only the suction air path available; which further comprises (a) a blowing mouth adapter having a hose connection part for blowing air and a blade for blowing direction control, the hose connection part for blowing air, fitting with the hose, stopping the suction air path and making only the blowing air path available, the blade for blowing direction control, capable of making air blow perpendicularly to the length and in reverse directions and (b) a separate blowing mouth having the hose connection part for blowing air, the separate blowing mouth, removably attached to a main body of the hybrid air cleaner via the hose and the blowing mouth adapter; and wherein the centrifugal fan intermittently operates while the separate blowing mouth is being used.

In the second hybrid air cleaner, the hose of the first hybrid air cleaner further comprises the blowing air path and the separate blowing mouth is attached to the main body of the second hybrid air cleaner via the hose and the blowing mouth adapter, being used in a form where the patient's head is put between (a) the main body of the second hybrid air cleaner and (b) the separate blowing mouth. The air flow for cleaning the whole room air discharged from the blowing mouth adapter, and the air flow for transferring the allergen suspended near a patient's respiratory organs is discharged from the separate blowing mouth. Further, the two air flows are discharged intermittently by a repeated on and off switching of the centrifugal fan. Because the suction air path and the blowing air path are mutually independent in the hose, the blowing air is not contaminated.

The second hybrid air cleaner does the following: (a) the allergen suction device removably attached sucks the allergen from bedding and so on, and removes the allergen, (b) the cleaner makes the air flow near a patient's head, having a straight-line motion at a low flow rate from the separate blowing mouth to the main body of the cleaner, and effectively transfers the suspended allergen near the respiratory organs; which reduces more of the allergen exposure of the patient.

BRIEF DESCRIPTION OF THE DRAWINGS

In the drawings:

FIG. 1 is an isometric view of a first hybrid air cleaner, whose side is partially broken away, having a third inertial separator IC3 and removably provided with a third allergen suction device SA3.

FIG. 2 is a transverse cross-sectional view of a main body of the first hybrid air cleaner having the third inertial separator IC3 and a motor F15 of a centrifugal fan mounted outward.

FIG. 3(*a*) is a vertical cross-sectional view of a front part of the main body of the first hybrid air cleaner; FIG. 3(*b*) is an isometric view, showing a suction plate F4, a plate F5 for adjusting a plurality of suction holes and a front cover F6 of the first hybrid air cleaner broken away.

FIG. 4(*a*) is a vertical cross-sectional view of a first inertial separator IC1 alone; FIG. 4(*b*) is an enlarged view of a final collection part H4 of FIG. 4(*a*).

FIG. 5(*a*) and FIG. 5(*b*) are fragmentary vertical cross-sectional views of a 8 times larger model ranging from the final collection part H4 to a diffuser H5*b* of a collection chamber part of FIG. 4(*a*).

FIG. 6 is a vertical cross-sectional view of the third inertial separator IC3 incorporated in the first hybrid air cleaner.

FIG. 7 is a cross-sectional view taken along a line A-A of FIG. 6.

FIG. 8 is an isometric view of the third inertial separator IC3 in an exploded state for cleaning.

FIG. 9 is an isometric view of a clamp H28 of the inertial separator IC3 of FIG. 8.

FIG. 10(*a*) is a fragmentary vertical cross-sectional view of a main body of a fourth inertial separator IC4, showing a plate PRBI for preventing initial re-scatter closed; FIG. 10(*b*) is a fragmentary vertical cross-sectional view of the main body of the fourth inertial separator IC4, showing the plate PRBI open.

FIG. 11(*a*) is a fragmentary vertical cross-sectional view of the main body of the fourth inertial separator IC4, with a plate PRB for preventing re-scatter closed, and FIG. 11(*b*) is a fragmentary vertical cross-sectional view of the main body of the fourth inertial separator IC4, with the plate PRB open; FIG. 11(*p*), showing another practical form of the plate PRB, is a fragmentary vertical cross-sectional view of the main body of the fourth inertial separator IC4, with a plate PRB2 for preventing re-scatter closed, and FIG. 11(*q*) is a fragmentary vertical cross-sectional view of the main body of the fourth inertial separator IC4, with the plate PRB2 open.

FIG. 12 is an assembly view of the main body of the fourth inertial separator IC4.

FIG. 13(*a*) is a vertical cross-sectional view of an electromagnet PREMI for preventing initial re-scatter and a driving plate of initial collection DBI, in combination; FIG. 13(*b*) is a vertical cross-sectional view of an electromagnet PREM for preventing re-scatter and a driving plate DB, in combination.

FIG. 14 is an isometric view of the first inertial separator whose inlet and outlet ducts are circular.

FIG. 15 is a vertical cross-sectional view of a neighborhood of a straight duct D5*a* of a collection chamber part of the first inertial separator of FIG. 14.

FIG. 16(*a*) is an isometric view of a third allergen suction device SA3; FIG. 16(*b*) is a side elevation view of the third allergen suction device SA3.

FIG. 17 is a top view of a vibrating brush S11.

FIG. 18 is a vertical cross-sectional view of an upper part of the third allergen suction device SA3 of FIG. 16(*a*).

FIG. 19 is an isometric view of two intermediate gears S13*b*, S13*c*, two intermediate gear supports S16*b*, S16*c*, and a driving motor support S17 partially broken away.

FIG. 20(*a*) is a top view taken along a line X-X of FIG. 16(*b*), with an upper body S1 of the third allergen suction device SA3 removed; FIG. 20(*b*) is a view showing the relationship of a plurality of gear pitch circles of the third allergen suction device SA3.

FIG. 21 is a cross-sectional view, vertically down taken along the line X-X of FIG. 16(*b*).

FIG. 22(*a*) is a cross-sectional view taken along a line Y-Y of FIG. 21; FIG. 22(*b*) is a cross-sectional view taken along a line Z-Z of FIG. 21.

FIG. 23 is an isometric view of a plate S21 for flow path change.

FIG. 24(*a*) is a top view of a switch S5*a* for flow path change and a stopper S6*a* of the switch S5*a*; FIG. 24(*b*) is a cross-sectional view taken along a line W-W of FIG. 24(*a*).

FIG. 25(*a*) is a cross-sectional view taken along a line U-U of FIG. 16(*b*); FIG. 25(*b*) is a cross-sectional view taken along a line V-V of FIG. 16(*b*).

FIG. 26 is an illustration of a joint line S80*a* of the body of device.

FIG. 27 is a fragmentary side elevation view of a second allergen suction device SA2.

FIG. 28(*a*) is a top view taken along a line X2-X2 of FIG. 27 with an upper cover S30 removed; FIG. 28(*b*) is a vertical cross-sectional view of an upper part of the second allergen suction device SA2.

FIG. 29 is a view for illustrating an action of a disc cam S33 and a vibrating brush S31.

FIG. 30 is an isometric view of a fourth allergen suction device SA4.

FIG. 31 is a fragmentary vertical cross-sectional view of the fourth allergen suction device SA4 operating with an adapter S50 for a quilt unattached.

FIG. 32 is an assembly view of a section of an inner body S43 of the fourth allergen suction device SA4.

FIG. 33 is a view for illustrating an action of a crank member S47*a* and a beating member S48*a*.

FIG. 34 is a fragmentary transverse cross-sectional view of the first hybrid air cleaner, wherein an outlet of a diffuser of the third inertial separator IC3 is reduced horizontally.

FIG. 35 is an isometric view of an inertial separator adapter IAHD, a hose HRD, and a third allergen suction device SA3D with a hose connection part CHDI in the second hybrid air cleaner.

FIG. 36(*a*) is an isometric view of a blowing mouth adapter EA0; FIG. 36(*b*) is a side elevation view of the blowing mouth adapter EA0.

FIG. 37 is an isometric view of a separate blowing mouth ES.

FIG. 38(*a*) is an illustration of using the separate blowing mouth ES of the second hybrid air cleaner while a patient is sleeping; FIG. 38(*b*) is a fragmentary vertical cross-sectional view of FIG. 38(*a*).

FIG. 39(*a*) is a vertical cross-sectional view showing a state where the hose connection part CHDI is being fitted to a terminal part HRDT of the hose HRD; FIG. 39(*b*) is an elevation view of the terminal part HRDT.

FIG. 40(*a*) is an elevation view of a hose connection part CHDE for blowing air; FIG. 40(*b*) is a vertical cross-sectional view showing a state where the hose connection part CHDE for blowing air is being fitted to the terminal part HRDT.

Each figure of FIG. 41(*a*) and FIG. 41(*b*) are views showing an inertial separator of a conventional duct (FIG. 41(*a*) is a view shown in U.S. Pat. No. 3,710,561; FIG. 41(*b*) is a view shown in U.S. Pat. No. 4,971,604).

DETAILED DESCRIPTION OF THE PREFERRED EMBODIMENTS

With reference to the drawings, the modes for carrying out the inertial separator and the hybrid air cleaner of the invention are explained. The arrangement of this section is as follows.
(1) The inertial separator and the first hybrid air cleaner of the invention
(1.1) The whole structure of the first hybrid air cleaner
(1.2) The inertial separator
(1.2.1) The first inertial separator
(1.2.2) The third inertial separator
(1.2.3) The fourth inertial separator
(1.2.4) The first inertial separator whose inlet and outlet ducts are circular
(1.3) The allergen suction device
(1.3.1) The third allergen suction device
(1.3.2) The second allergen suction device
(1.3.3) The fourth allergen suction device
(2) The second hybrid air cleaner (1) The Inertial Separator and the First Hybrid Air Cleaner of the Invention First, the whole structure of the first hybrid air cleaner is explained. Next the inertial separator and the allergen suction device removably attached to the first hybrid air cleaner are explained.

(1.1) The Whole Structure of the First Hybrid Air Cleaner

FIG. 1 is an isometric view of the first hybrid air cleaner, whose side is partially broken away, having a third inertial separator IC3 and removably provided with a third allergen suction device SA3.

Figure 2:
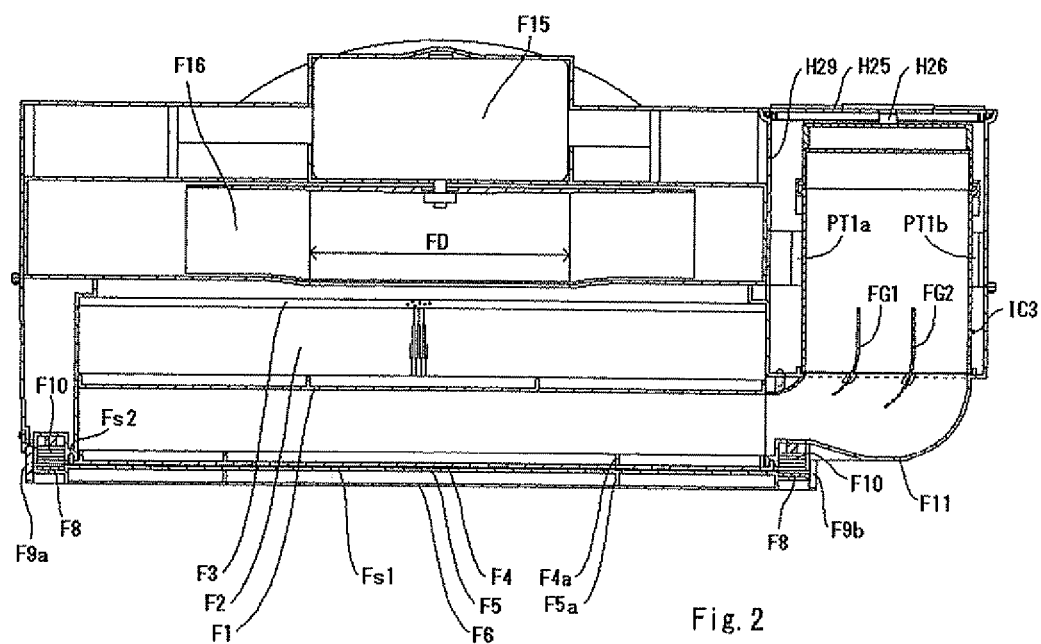

The filter collection part has a pre-filter F1, a filter medium F2 and a deodorizing filter F3 (FIG. 2, FIG. 3(*a*)). HEPA, ULPA and so on are used as the filter medium F2. A connection part F11 connects an outlet of the third inertial separator IC3 and a space that is formed between a suction plate F4 and the pre-filter F1 (FIG. 1, FIG. 2).

In the suction plate F4 and a plate F5 for adjusting a plurality of suction holes F7, a plurality of projections F4*a*, F5*a* are perpendicularly formed for reinforcement (FIG. 2, FIG. 3(*a*), FIG. 3(*b*)). It is preferable that the suction plate F4 is provided with a sealing member Fs1 to increase airtightness and a sealing member Fs2 is attached to a place where the suction plate F4 is fitted to the body of the hybrid air cleaner. Further, it is preferable that the plate F5 is provided with a front cover F6 for the sake of appearance (FIG. 2, FIG. 3(*a*), FIG. 3(*b*)). Further, it is preferable that a plurality of guide blades FG1, FG2 are set in a region from the third inertial separator IC3 to the connection part F11 (FIG. 2).

When room air is cleaned, the plate F5 is moved downwards and the suction holes F7 of the plate F5 and the suction plate F4 are set in order. Further, an inlet H20 of the inertial separator is closed by a plate H23 for opening and closing the inlet H20 and a member H24 (FIG. 1, FIG. 3(*a*), FIG. 6). When the allergen is to be sucked and removed directly from bedding, hair, clothes and so on, the plate F5 is pulled up with a hollow F5*b* hooked by fingers and the suction holes F7 are closed. Further, a hose HR and an inertial separator adapter IAH is attached to the third allergen suction device SA3 and the inertial separator adapter IAH is fitted to the inlet H20 (FIG. 1, FIG. 3(*a*)).

It is preferable that the plate F5 has a plurality of uneven parts on an edge and engage with a plurality of supports F9*a*,F9*b*, although the uneven parts are not shown in figures. It is further preferable that the plate F5 is hanged by a hook F14 formed at an upper part of the first hybrid air cleaner with a torsion coil spring, which is shown in FIG. 1 and FIG. 3(*a*).

Furthermore, when a plurality of ferromagnetic materials F8 for tight closure are attached at an edge of the plate F5 and a plurality of electromagnets F10 for tight closure held by the body of the cleaner or the connection part F11 are energized during an operation of the third allergen suction device SA3, an airtightness between the suction plate F4 and the plate F5 automatically increases (FIG. 2).

In addition, FIG. 2 shows a case where a motor F15 of a centrifugal fan is mounted outside an impeller F16. In this case, an inside diameter FD of the impeller F16 can be small and a larger static pressure is obtained with a direction of a plurality of impeller blades backward, while the wind flow rate is reduced. In that case, when the centrifugal fan has a plurality of guide blades that are formed with a plurality of inlet parts of the impeller blades extending inward, the centrifugal fan has a larger shutoff pressure. Further, when the air velocity has more significance than the static pressure, the inside diameter FD of the impeller is set larger and the impeller blades are directed forward. In this case, the motor can be mounted inside the impeller.

(1.2) The Inertial Separator

Figure 6:
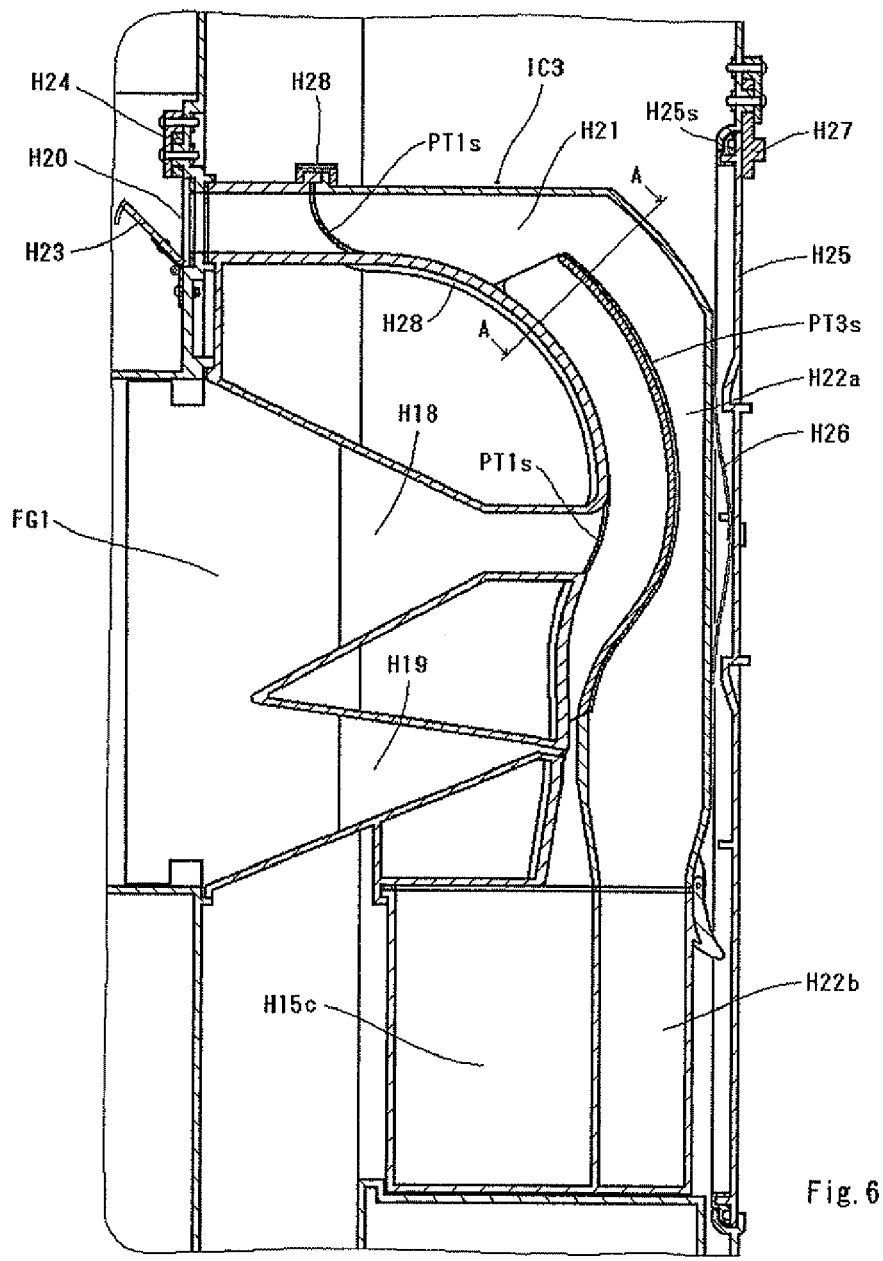

FIG. 4(*a*) is a vertical cross-sectional view of a first inertial separator IC1 alone; FIG. 6 is a vertical cross-sectional view of the third inertial separator IC3 incorporated in the first hybrid air cleaner. First, the main functions of the inventive inertial separator are explained with the first inertial separator IC1 referred.

(1.2.1) The First Inertial Separator

A first half H1 of a main duct is a curved duct having a constant curvature with a rectangular cross-section. A latter half H2 is a curved duct, having a constant curvature, with a rectangular cross-section and an outside wall removed. In the first half H1, an aspect ratio of a spanwise channel width to a radial is 5.63 and a ratio of an inside radius to an outside is 0.77 (FIG. 4(*a*)). In the latter half H2, the aspect ratio is 5.63 and a ratio of an inside radius to a removed outside radius is 0.27 (FIG. 4(*a*)). A final collection part H4 has a straight inlet duct H4*di*, a straight outlet duct H4*do*, and a curved duct H4*c*, which is formed between the two straight ducts H4*di* and H4*do*, with an outside wall section removed. A ratio of a radial channel width of the curved duct H4*c* to a radial channel width of the latter half H2 is 0.15. In the curved duct H4*c*, a ratio of an inside radius to a removed outside radius is 1:3 (FIG. 4(*a*), FIG. 4(*b*)).

A flow is stable on the inside of a flow path of the first half H1 of the main duct, which corresponds to a convex wall of the duct with high aspect ratio, so a particle with a diameter of marginal collection is biased to a center of the flow at an exit of the first half H1. Next, the particle escapes from a main flow in the latter half H2 with a larger curvature than the first half H1. Even if an outside wall of the latter half H2 is removed and a collection chamber part is simply formed in succession, the collection efficiency is not good. Therefore, a part H3 for sucking the boundary layer is formed, so that a largely disturbed air flow over a concave wall of the main duct is sucked and introduced to the final collection part H4. The particles are separated from the air at the curved duct H4c with the largest curvature, wherein the disturbance of flow is small (FIG. 4(a), FIG. 4(b)).

An exit of the latter half H2 of the main duct and an exit of the outlet straight duct H4do of the final collection part H4 join together, passing through a diffuser H8 and a diffuser H9, respectively. It is preferable that a straight duct H7 is formed between the latter half H2 and the diffuser H8 so that a static pressure of an inside flow path of the latter half H2, which is reduced because of centrifugal force, is recovered to some extent (FIG. 4(a)).

An angle formed by the straight inlet duct H4di and the straight outlet duct H4do of the final collection part H4 is 80°. A collection chamber part has a straight duct H5a, a diffuser H5b and a collection chamber H5c (FIG. 4(a), FIG. 4(b)).

Concerning the flow of the curved duct H4c of the final collection part H4 and the straight duct H5a of the collection chamber part, a model is employed for explanation. Reynolds number based on a radial channel width of the straight inlet duct H4di was about 1000 to 2000. An 8 times larger model ranging from the final collection part H4 to the diffuser H5b, shown in FIG. 4(a), was used. Smoke was generated and the flow was observed at the almost same Reynolds number. In a straight duct HM5a of the collection chamber part, a vortex with a diameter of a width of the straight duct HM5a was observed (FIG. 5(a)). A downwash HM5vd of the vortex is stronger than an upwash HM5vu. An outside flow HM4ca of the main flow in a curved duct HM4c is stable and an influence of the upwash HM5vu was not observed. According to a ready measurement of the flow velocity, the one of the upwash HM5vu is about 10 to 20% of that of a straight inlet duct HM4di, and a disturbance was hardly observed in a diffuser HM5b.

A particle with a diameter which is about 1.5 times larger than a diameter of marginal collection passes straight in the curved duct HM4c, entering the straight duct HM5a, and passes through the upwash HM5vu, reaching the diffuser HM5b. A particle Ptm with a diameter which is near the diameter of marginal collection, slightly following the flow in the curved duct HM4c, enters the straight duct HM5a. Some of such particles, passing through the downwash HM5vd, reach the diffuser HM5b. Assuming that the particle Ptm enters the straight duct HM5a with a particle velocity which is 90% of a main flow velocity of the curved duct HM4c, and the particle Ptm goes against an upward parallel air flow whose velocity is 10 to 20% of that, a power approximation is determined for the resistance coefficient of a particle, in the interval of particle Reynolds number from 0.5 to 20 and the equation of motion is solved. According to the result, the particle Ptm passing through the upwash HM5vu goes approximately for a distance of a duct width of the straight duct HM5a and the particle velocity becomes zero. The particle Ptm which lost momentum is carried by a right side flow of the vortex including the upwash HM5vu and re-enters the outside flow HM4ca of the main flow through a region HM5g which is similar to a stagnant zone (FIG. 5(b)). A velocity of the particle Ptm having re-entered the outside flow HM4ca is small compared with a velocity of the outside flow HM4ca, so the particle Ptm returns again to the straight duct HM5a by the outside flow HM4ca, reaching the diffuser HM5b by the downwash HM5vd. It is preferable that a small convex part H5d is formed at an upper part of the straight duct H5a of the collection chamber part (FIG. 4(b)). In that case, it is considered that a part of an outside wall of the curved duct H4c is formed by a plane and is not removed.

The pressure loss of the inertial separator is about 60 to 250 Pa at a flow rate of 0.6 to 1.2 m$^3$/min.

(1.2.2) The Third Inertial Separator

FIG. 6 is a vertical cross-sectional view of the third inertial separator IC3 incorporated in the first hybrid air cleaner.

Particles sucked from bedding include particles with a large diameter like soil particles resulting from opening windows and so on. In the first inertial separator, the particle having large inertia and unfixed form irregularly bounces on an outside wall H2a ranging from the first half H1 to the latter half H2 and occasionally escapes to the straight duct H7 (FIG. 4(a)). Therefore, in the third inertial separator, an outside wall of an initial part of a curve of the first half H1 is removed and an initial collection mouth H21 is formed so that the particles having large inertia and unfixed form going straight from the inlet H20 are removed beforehand (FIG. 6).

A part with an initial collection chamber H22b succeeds the initial collection mouth H21 and the part has an introduction part H22a. A back door H25 of the hybrid air cleaner is provided with a sealing member H25s in an inside periphery.

A radial channel width of an outlet of the latter half may be slightly narrower than that of an inlet of the latter half.

Figure 7:
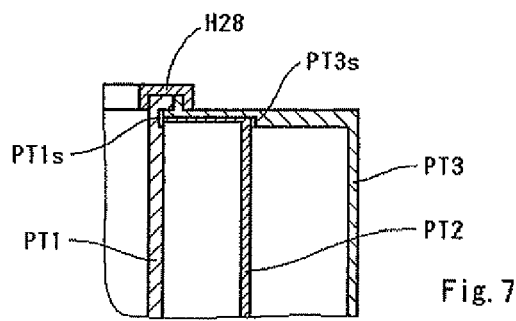
Figure 8:
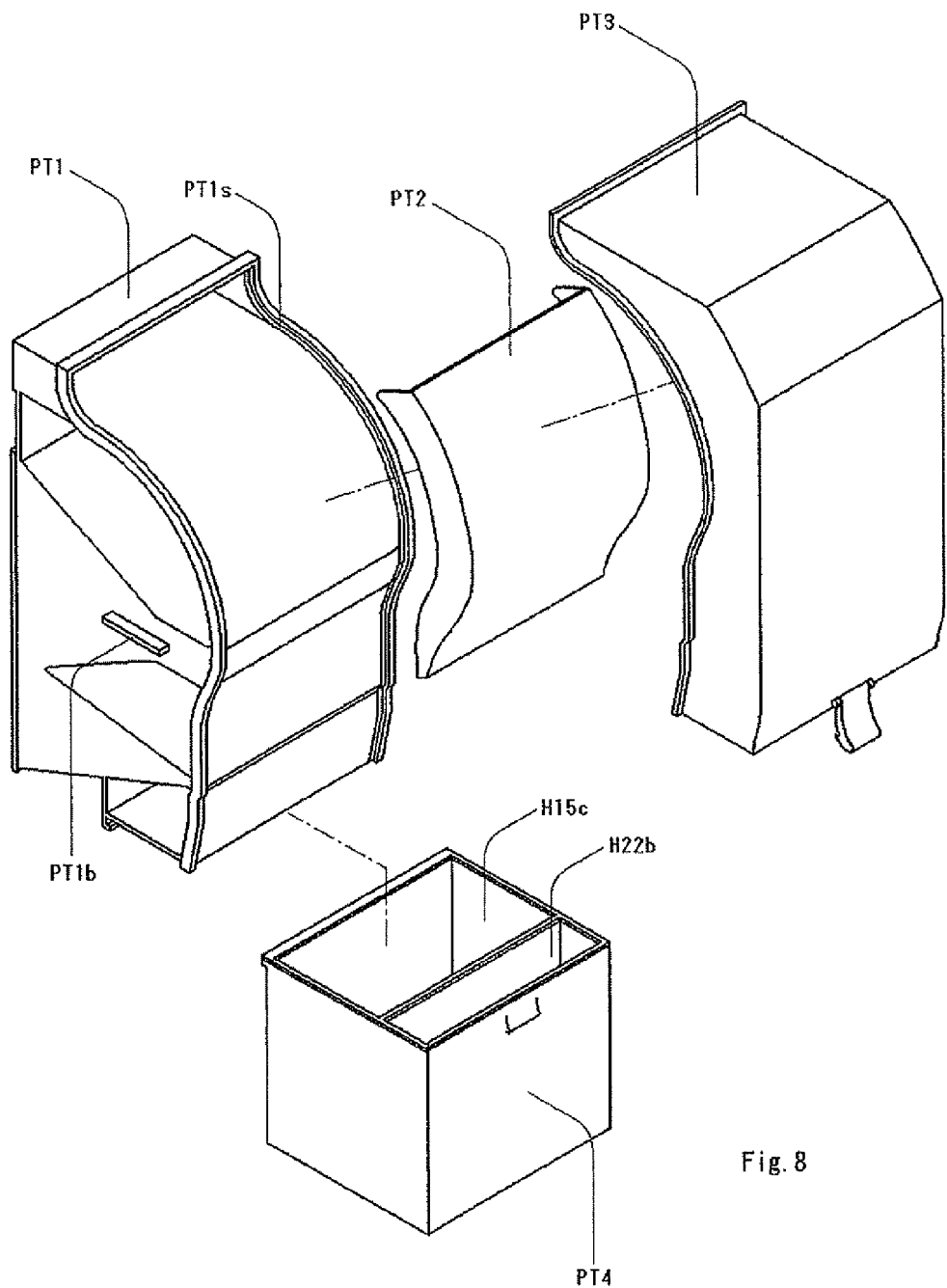

The third inertial separator IC3 can be disassembled to a plurality of members PT1, PT2, PT3 and a joint collection chamber PT4, and be cleaned (FIG. 8). The members PT2 and PT3 are nested, which is shown in FIG. 7. It is preferable that a plurality of sealing members PT1s and PT3s are attached to a plurality of places where the members PT1, PT2 and PT3 combine (FIG. 6, FIG. 7). The members PT1, PT2, PT3 and the joint collection chamber PT4 are combined after cleaning and temporarily secured by a clamp H28 made of flexible polyethylene, shown in FIG. 9. After that, they are put into the body of the hybrid air cleaner and a back door H25 is closed with a member H27 turned (FIG. 2, FIG. 6). The back door H25 is provided with a leaf spring H26 and the leaf spring H26 presses a back of the member PT3, increasing an airtightness of the third inertial separator IC3 (FIG. 2, FIG. 6).

The joint collection chamber PT4 has the initial collection chamber H22b and a collection chamber H15c. Two projections PT1a and PT1b are formed on a right and left side of the member PT1, respectively. The projections PT1a and PT1b engage a plurality of right and left projections of the body of the hybrid air cleaner respectively and the joint collection chamber PT4 is taken out separately for cleaning (FIG. 1, FIG. 2, FIG. 6, FIG. 8).

It is preferable that the members PT1, PT2, PT3 and the joint collection chamber PT4 are made of a material for preventing static charge like a conductive plastic and so on.

(1.2.3) The Fourth Inertial Separator

The fourth inertial separator prevents the already collected dust from re-scattering owing to the vibration of the hybrid air cleaner caused by the motor and so on, while inertial collection is not performed. Referring to the figures from FIG. 10(a) to FIG. 13(b), the mode for carrying out the fourth inertial separator is explained.

Figure 12:
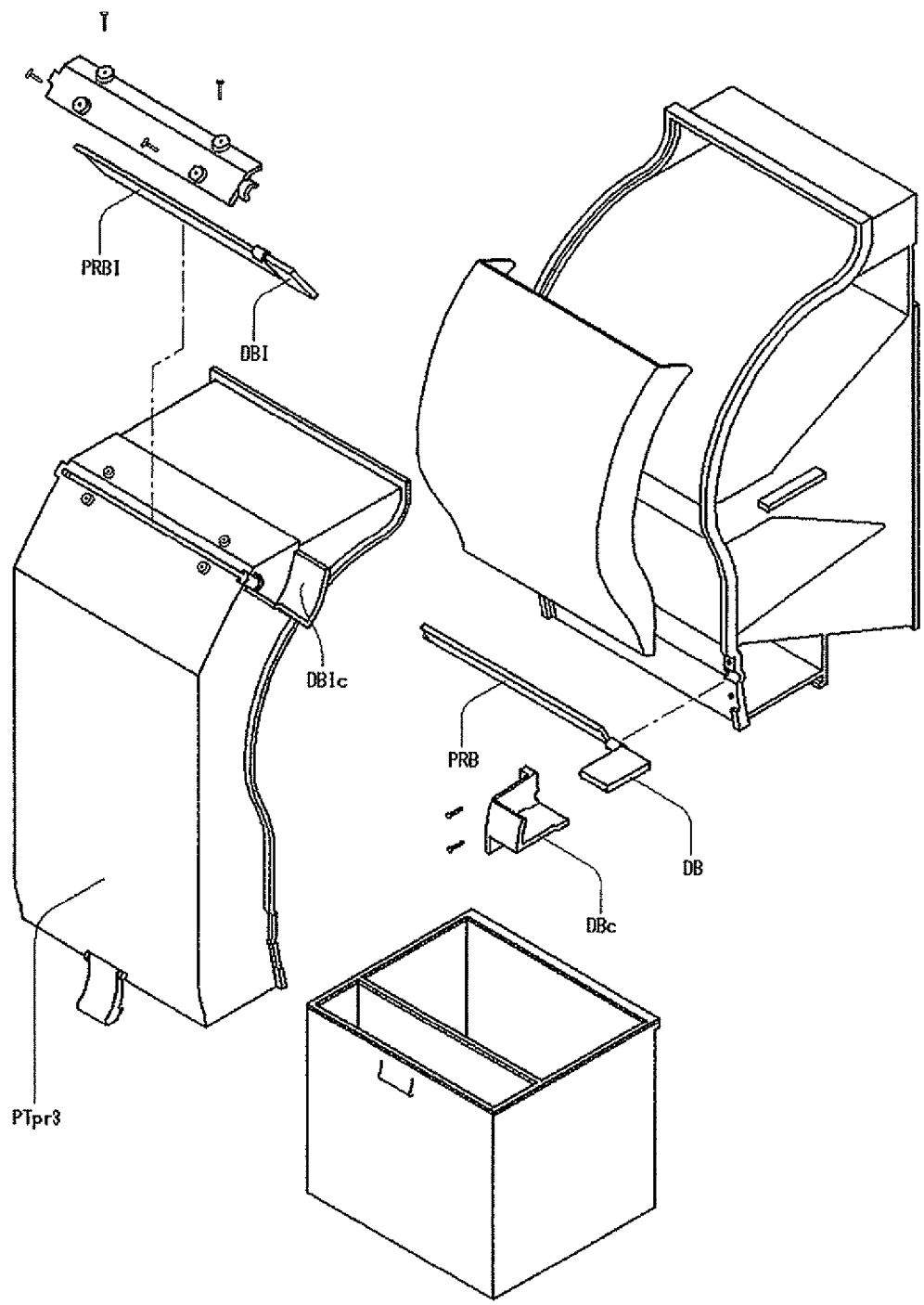

In the fourth inertial separator, an upper part of the part with the initial collection chamber is equipped with a plate PRBI for preventing initial re-scatter connecting with a driving plate of initial collection DBI, and the upper part of the collection chamber part is equipped with a plate PRB for preventing re-scatter connecting with a driving plate DB (FIG. 10(a), FIG. 11(a), FIG. 12).

When a main body of the fourth inertial separator IC4 shown in FIG. 12 is assembled and put into the first hybrid air cleaner, the driving plate of initial collection DBI and the driving plate DB are coupled with an electromagnet PREMI for preventing initial re-scatter and an electromagnet PREM for preventing re-scatter, respectively (FIG. 13(a), FIG. 13(b)). The electromagnets PREMI and PREM are engaged or screwed to a plurality of projections H29a,H29b and H29c, H29d, respectively, which can be formed on a wall H29 in the body of FIG. 2. The projections H29a,H29b,H29c and H29d are not shown in FIG. 2. The plates PRBI and PRB are closed when the fourth inertial separator IC4 is not used. While the fourth inertial separator IC4 is being used, the electromagnets PREMI and PREM are energized, attracting the plates DBI and DB, and opening the plates PRBI and PRB, respectively (FIG. 10(a), FIG. 10(b), FIG. 11(a), FIG. 11(b)). In such a way, the already collected dust is prevented from re-scattering from the part with the initial collection chamber and the collection chamber part owing to the vibration of the motor and so on, when the fourth inertial separator IC4 is not used.

A part DBIc projectingly formed on a member PTpr3 protects the plate DBI, and a member DBc protects the plate DB, which prevents the plates DBI and DB from being damaged while the fourth inertial separator IC4 is cleaned (FIG. 12, FIG. 13(a), FIG. 13(b)).

The plate PRB is formed at an inlet of the collection chamber part shown in FIG. 11(a) and FIG. 11(b). Further, the plate for preventing re-scatter may be formed lower than the plate PRB, shown in FIG. 11(p) and FIG. 11(q). Furthermore, when a plastic mixed with fluorochemical resin having a low coefficient of friction is used for a bearing of the plate for preventing re-scatter, opening and closing is more smoothly performed.

(1.2.4) The First Inertial Separator Whose Inlet and Outlet Ducts are Circular

Another mode for carrying out the inventive inertial separator is shown in FIG. 14, an isometric view of the first inertial separator whose inlet and outlet ducts are circular. FIG. 15 is a vertical cross-sectional view of a neighborhood of a straight duct D5a of a collection chamber part of the first inertial separator of FIG. 14.

Each of a first half D1 and a latter half D2 has an aspect ratio of 9. From another view point, it can be considered that the first inertial separator has a following function: While the air flow containing dust passes through the first half D1 and the latter half D2, reaching a junction D6, a concentrated air flow of an outside of the duct is, so to speak, bypassed to a part D3 for sucking the boundary layer and a final collection part D4, with the result that the dust is collected (FIG. 14).

Two windows for cleaning are opened on the part D3 and the straight duct D5a, with two covers D7a and D7b (FIG. 14, FIG. 15).

(1.3) The Allergen Suction Device

First, the third allergen suction device is explained in detail with figures FIG. 16(a)-FIG. 26 referred. Next, the first, second and fourth allergen suction device are described.

Figure 16A:
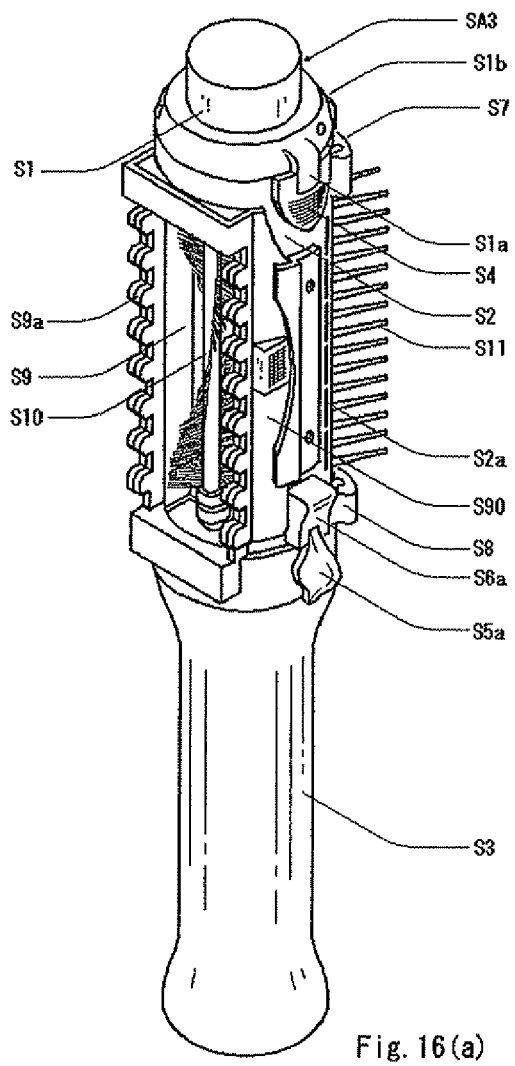
Figure 16B:
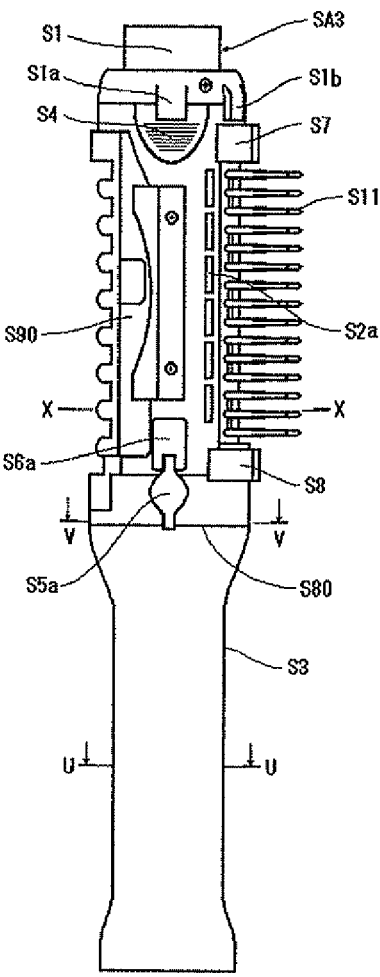
Figure 18:
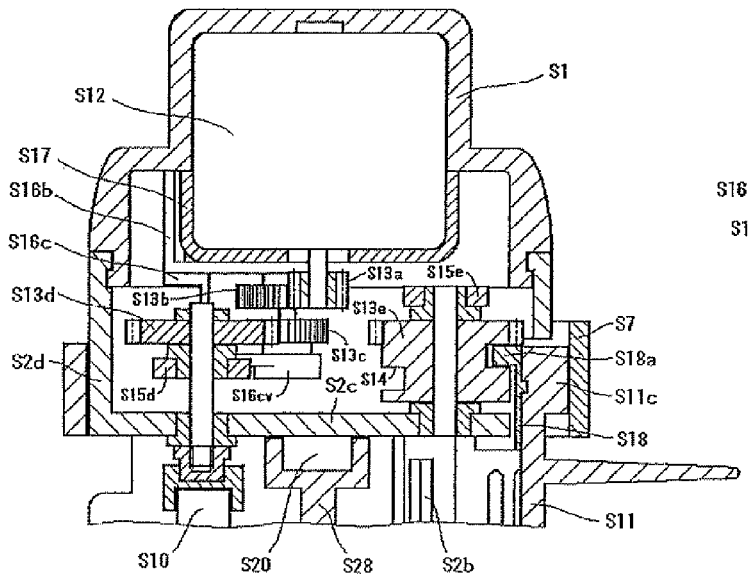
Figure 19:
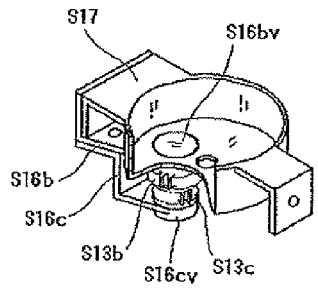

In a third allergen suction device SA3, the user fixes either a claw S1a for a suction mode of a rotating brush S10 or a claw S1b for a suction mode of a vibrating brush S11, which are formed on an edge of an upper body S1 of device, by a claw stopper S4 to select the suction mode (FIG. 16(a), FIG. 16(b)). A driving motor S12 and two intermediate gears S13b, S13c are supported by an upper body S1 through a driving motor support S17 and two intermediate gear supports S16b, S16c (FIG. 18, FIG. 19). The intermediate gear S13c is engaged with either a gear S13d for the rotating brush S10 or a gear of a gear-columnar-cam S13e for the vibrating brush S11 (FIG. 18, FIG. 19, FIG. 20(a), FIG. 20(b)). In the gear-columnar-cam S13e, a gear and a columnar cam are integrally formed and a rotational motion is converted into a reciprocating straight line motion by a sinusoidal groove S14 of a side. The gear-columnar-cam S13e may be replaced with a gear and a columnar cam, which are independent. The gear S13d and the gear-columnar-cam S13e are supported by two arms S15d,S15e of a support S15 and the support S15 is screwed to an upper plate S2c of the body of device (FIG. 18, FIG. 20(a)). Furthermore, two projections S16bv and S16cv are formed at two bearing supports of the intermediate gear supports S16b and S16c outward, respectively (FIG. 19). The projection S16bv is fitted in a bore of the driving motor support S17, increasing the stability of driving system (FIG. 19).

Figure 20A:
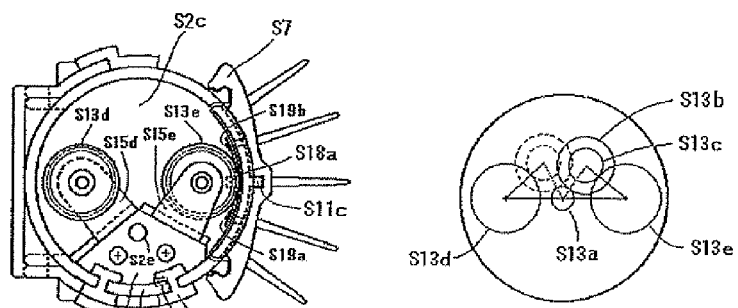
Figure 20B:
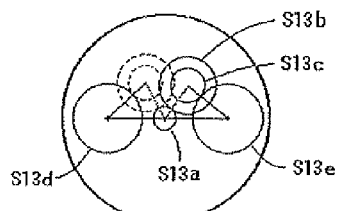

A metal member S18 is secured to an upper part of the vibrating brush S11 by two screws S19a,S19b and a projection S18a is projected in the sinusoidal groove S14 (FIG. 18, FIG. 20(a)). The metal member S18 may be joined by insert molding instead of screwing.

Figure 17:
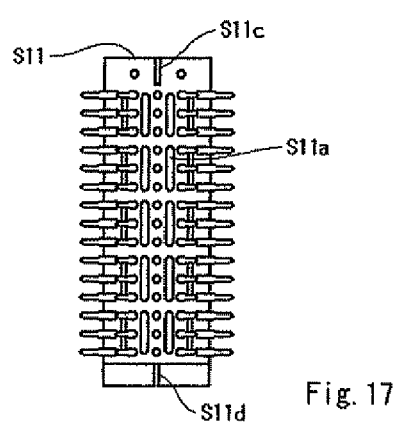

A plurality of suction holes S11a of a brush plate are opened in the vibrating brush S11, shown in FIG. 17. The vibrating brush S11 vibrates lengthwise, removing and sucking pollen that adheres to a surface or an inside of a bundle of hair. Two projections S11c,S11d which guide vibration are formed in an upper part and a lower part of the vibrating brush S11, respectively (FIG. 17, FIG. 20(a)). The vibrating brush S11 is removably attached to the body of device by an upper clamp S7 and a lower clamp S8 made of plastic, and is easily cleaned (FIG. 16(a), FIG. 16(b), FIG. 20(a), FIG. 21).

Figure 21:
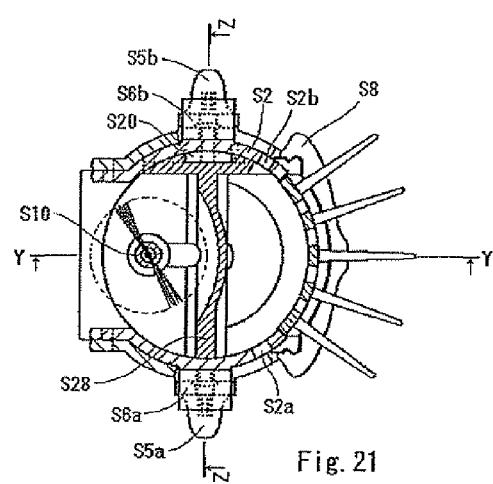

A plurality of suction holes S2a,S2b of the vibrating brush side are open, right and left respectively, on the body of device (FIG. 16(a), FIG. 16(b), FIG. 21). The suction holes S2a,S2b of the vibrating brush side restrain an excessive suction of hair from the suction holes S11a of the brush plate and suck the pollen moving apart from the bundle of hair to an outer space owing to the vibration of the vibrating brush S11.

The rotating brush S10 effectively removes the pollen adhering to the surface of clothes, sofas, bedding and so on. A side S9a of a wide suction mouth S9 is formed to a wavy shape. It is preferable that the side S9a is outward provided with a wavy member S90 which can slide (FIG. 16(a), FIG. 16(b)). In such a way, when the mite allergen is sucked from the inner part of bedding, the flow can be throttled, the static pressure increasing. On the other hand, when the pollen adhering to the surface of clothes and so on is sucked, the flow can be increased.

A switch S4a of sliding type for detecting an position of the claw stopper S4 exists between the claw stopper S4 and a side wall S2d of an upper part of the body of device (FIG. 20(a)). When the user gets down the claw stopper S4 to change the suction mode, the switch S4a detects the position of the claw stopper S4 and the driving motor S12 is driven in a low torque. At that time, it is not necessary that the rotating brush S10 or the vibrating brush S11 is acting. Next, the user detaches the claw stopper S4 from the claw S1a or the claw S1b and slides the upper body S1, engaging the gear of the desired suction mode. At that time, even if the gear is not engaged at a first attempt, the gear is engaged immediately because the intermediate gear S13c is slowly rotating. The detection of the position of the claw stopper S4 and the transition to a low torque driving of the driving motor S12 is performed, whether the driving motor S12 is at a stop or in action, in the two suction modes. Therefore, the user can change the suction mode of the vibrating brush, wherein pollen is removed from hair, to the suction mode of the rotating brush, wherein pollen is removed from clothes, without switching off the third allergen suction device SA3.

The rotating brush S10 and the vibrating brush S11 are separated by a flow path bulkhead S28 with a T-like-shaped section (FIG. 21). A path S20 for a plurality of electric wires is formed between the flow path bulkhead S28 and a body S2 of device (FIG. 21). The electric wires for the driving motor S12 and the switch S4a are guided from a hole S2e of the upper plate S2c to the path S20 (FIG. 20(a), FIG. 18). In addition, the electric wires are omitted in these figures.

When the suction mode is changed, the user pulls up two stoppers S6a,S6b of two switches S5a,S5b for flow path change and turns the switches S5a,S5b by 180° (FIG. 16(a), FIG. 21, FIG. 22(b), FIG. 24(a)). The whole shape of a plate S21 for flow path change is a semicircle-like plate, which is partially broken away, shown in FIG. 23. Two prism-like ends of two members 23a,S23b in the switches S5a,S5b are forced into an axis of the plate S21 (FIG. 22(a), FIG. 22(b)). For example, the members S23a,S23b are formed of steel and the plate S21 is of aluminum alloy. Concerning the plate S21, it is also preferred that most of the plate S21 is formed of plastic with a part containing the axis of the plate S21 formed of metal and that they are screwed together. A place where the body S2 of device and the flow path bulkhead S28 are contacted by the plate S21 is provided with a sealing member S22 (FIG. 22(a), FIG. 22(b)).

A grip S3 is fitted to the body S2 of device at a joint line S80 and they are fastened by two screws S27a,S27b, in addition to an adhesive agent (FIG. 16(b), FIG. 22(a), FIG. 22(b), FIG. 25(b)). Further, when the joint line S80 is bent at a place of the switches S5a,S5b, like a joint line S80a shown in FIG. 26, the members S23a,S23b in the switches S5a,S5b can be formed integrally with the plate S21 after they are varied in form.

The third allergen suction device SA3 can be accommodated in a container F13 (FIG. 1).

Furthermore, it is preferable that the vibrating brush S11 is made of a material for preventing static charge like a conductive plastic and so on.

(1.3.2) The Second Allergen Suction Device

Figure 27:
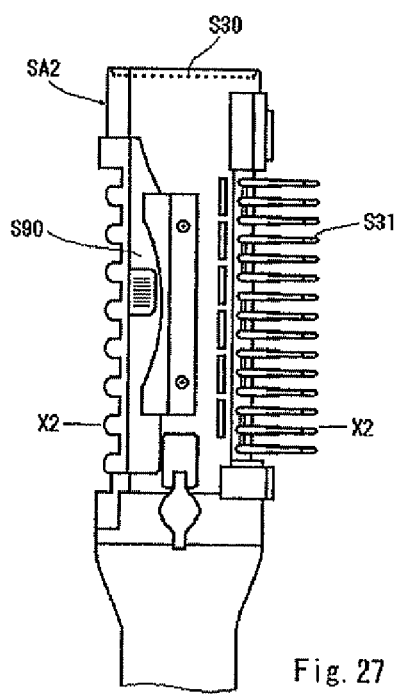
Figure 28A:
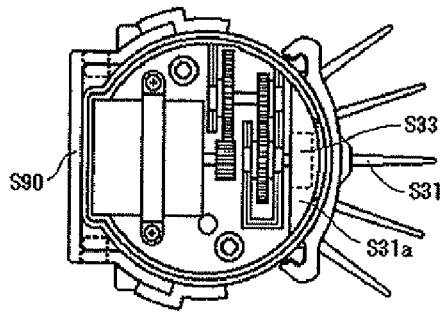
Figure 28B:
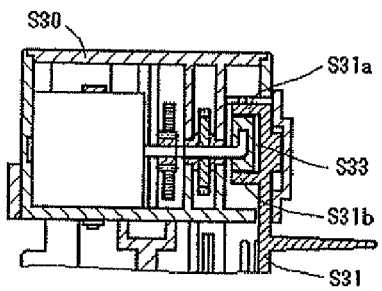
Figure 29:
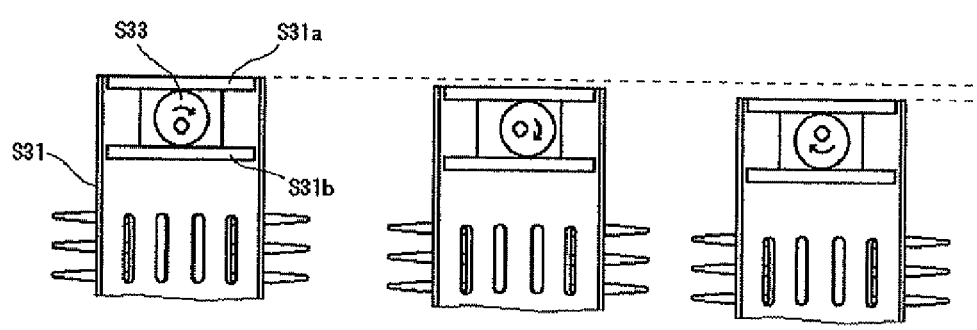

FIG. 27 is a fragmentary side elevation view of a second allergen suction device SA2. FIG. 28(a) is a top view taken along a line X2-X2 of FIG. 27 with an upper cover S30 removed; FIG. 28(b) is a vertical cross-sectional view of an upper part of the second allergen suction device SA2. FIG. 29 is a view for illustrating an action of a disc cam S33 and a vibrating brush S31.

The second allergen suction device SA2 has the vibrating brush S31. In an upper part of the vibrating brush S31, two flat plates S31a,S31b are formed (FIG. 28(a), FIG. 28(b)). A rotational motion is converted into a reciprocating straight line motion by the disc cam S33 located between the flat plate S31a and S31b (FIG. 28(b), FIG. 29).

Further, the first allergen suction device has a wide suction mouth, not shown in figures.

(1.3.3) The Fourth Allergen Suction Device

Figure 30:
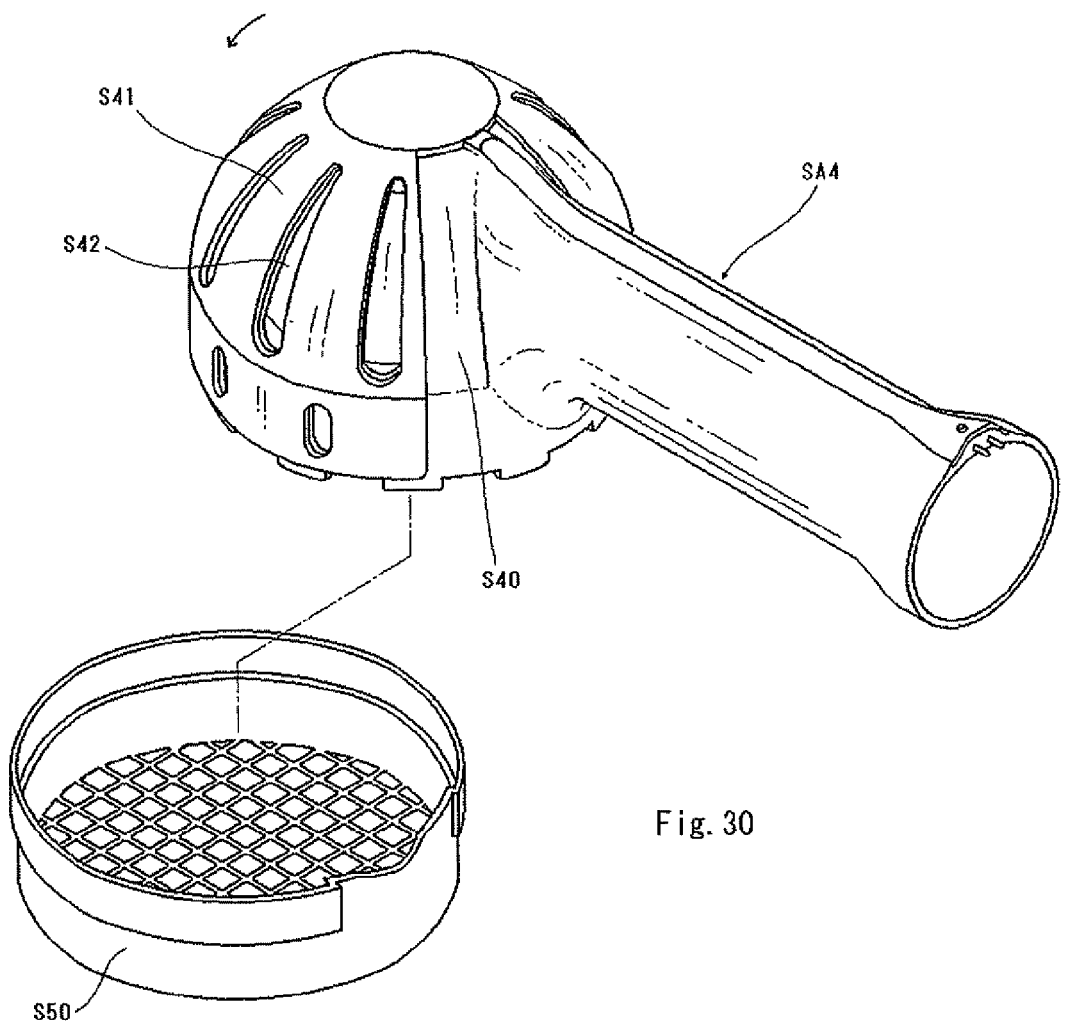
Figure 31:
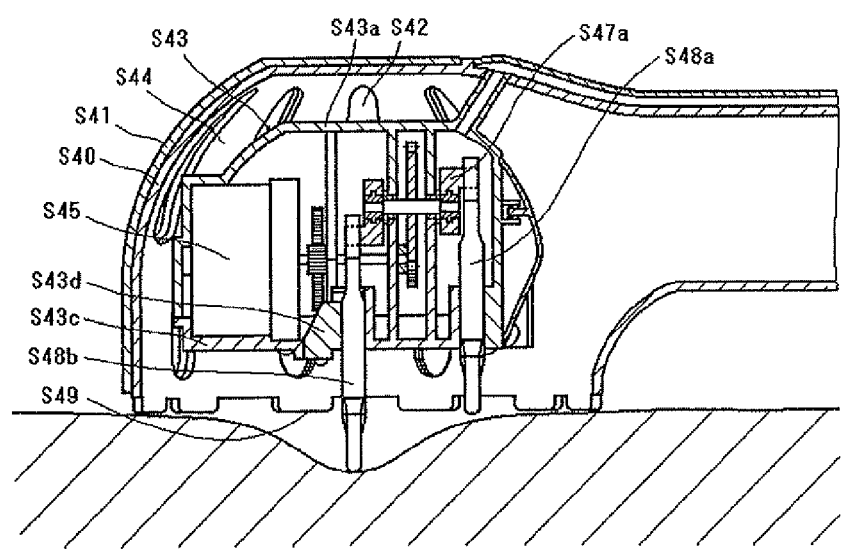
Figure 32:
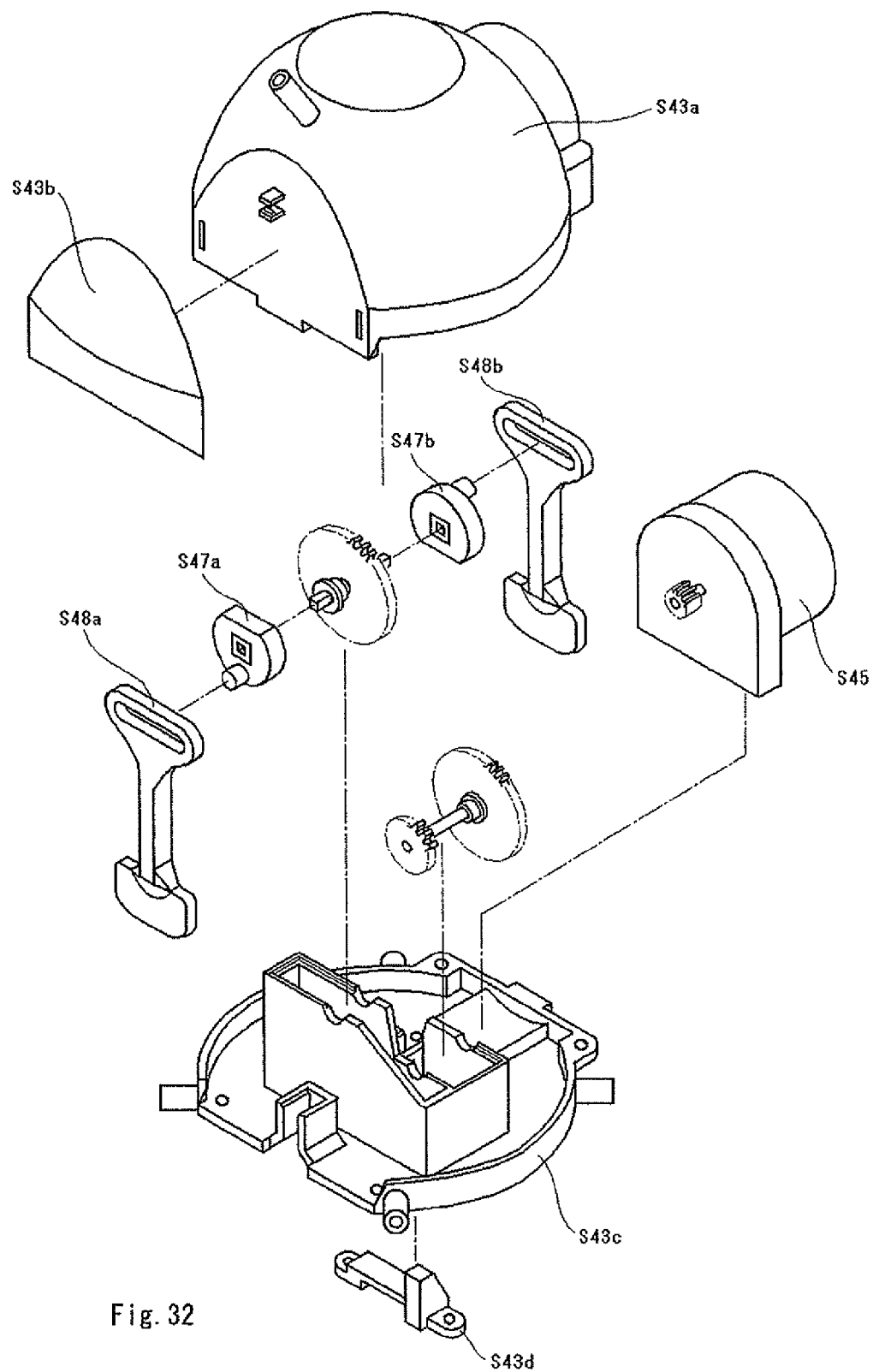

FIG. 30 is an isometric view of a fourth allergen suction device SA4. FIG. 31 is a fragmentary vertical cross-sectional view of the fourth allergen suction device SA4 operating with an adapter S50 for a quilt unattached. FIG. 32 is an assembly view of a section of an inner body S43 of the fourth allergen suction device SA4.

Figure 33:
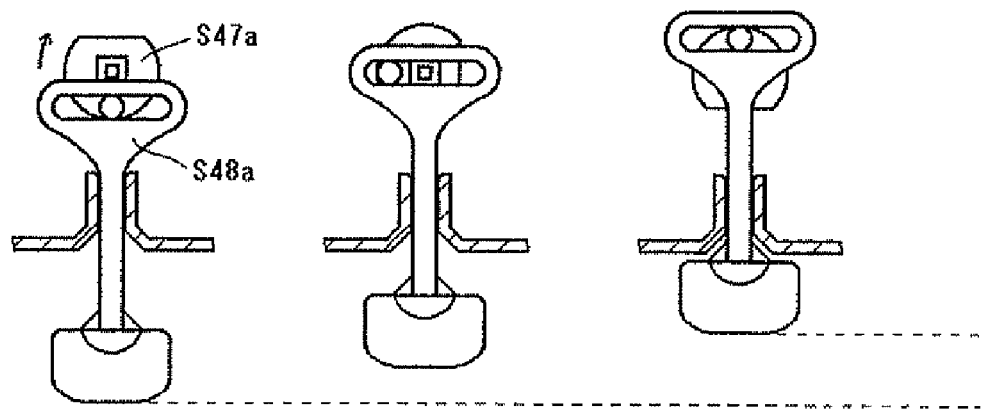

When the fourth allergen suction device SA4 is used for sucking the allergen from a comparatively hard bedding, for example a mattress, a pillow and so on, the adapter S50 is detached and two beating members S48a,S48b are put into action with a plurality of suction mouths S42 of an outer body S40 of device open (FIG. 30, FIG. 31). The beating members S48a,S48b reciprocate according to a rotational motion of two crank members S47a,48b (FIG. 31, FIG. 32, FIG. 33). This is the reciprocating block double-slider crank mechanism and is a so-called Scotch yoke.

When bedding is beaten, the allergen existing in an inner part of bedding, which is hard to remove by simple suction, scatters. The allergen on the surface also scatters because a bed sheet around the device is stretched. The allergen scattering under the device is sucked from a wide suction mouth S49 that has a circular shape and exists in an underside of the outer body S40 of device (FIG. 30, FIG. 31). The allergen scattering in the surrounding area of the device is sucked from the suction mouths S42 of the outer body S40 of device (FIG. 30, FIG. 31). The suction air from the suction mouths S42 passes through a flow path S44 between the inner body S43 of device and the outer body S40 (FIG. 31). In addition, the inner body S43 comprises an inner body part S43a, an inner body part S43b, an inner body part S43c and in inner body part S43d (FIG. 31 and FIG. 32). A driving motor S45 is contained in the inner body S43 (FIG. 31 and FIG. 32).

When the allergen is sucked from a comparatively soft bedding, the suction mouths S42 are closed with a cover S41 and the adapter S50 is attached (FIG. 30).

Figure 34:
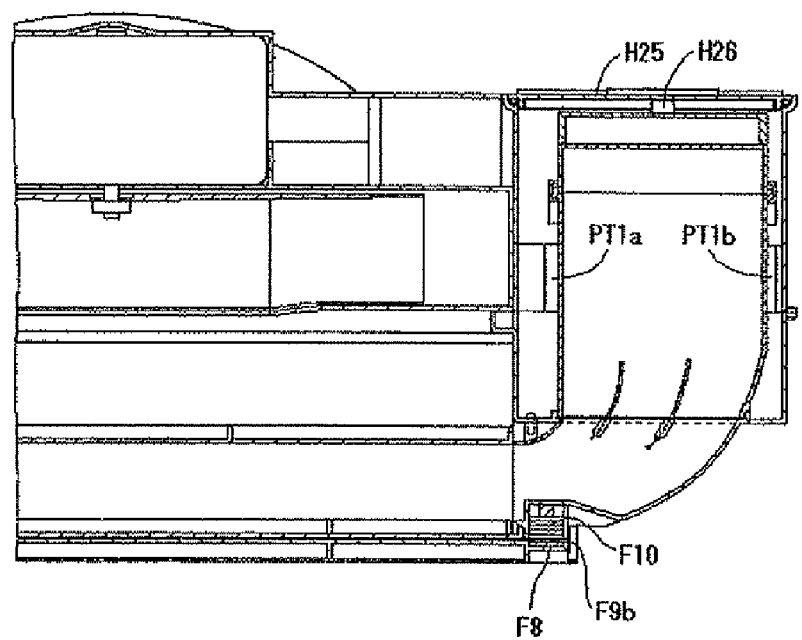

Furthermore, in the first hybrid air cleaner, when an outlet of two diffusers H18,H19 of the third inertial separator IC3 are reduced laterally on the outside, a flow of the connection part F11 is improved (FIG. 2, FIG. 6, FIG. 34).

(2) The Second Hybrid Air Cleaner

Figure 35:
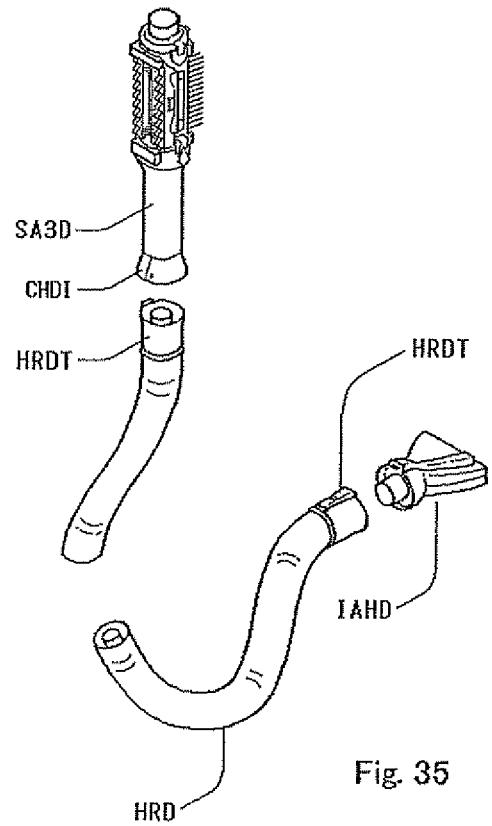
Figure 36A:
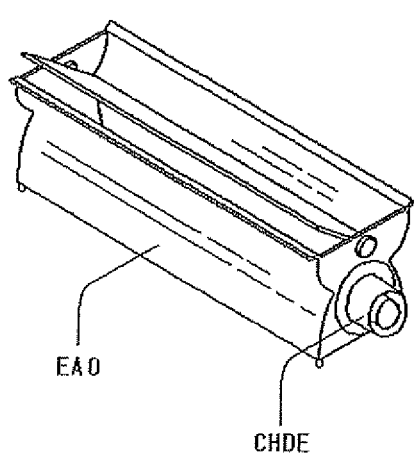
Figure 36B:
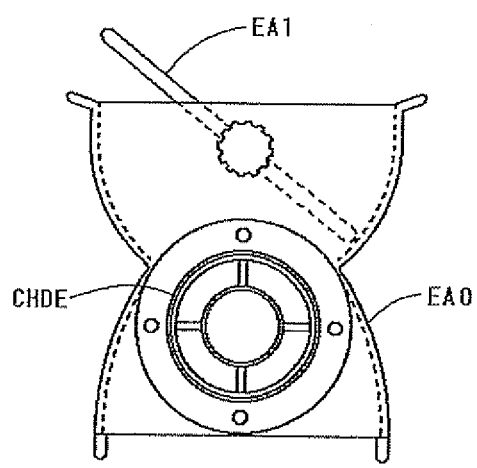
Figure 37:
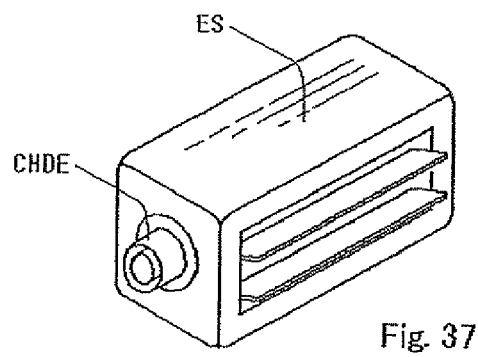
Figure 38A:
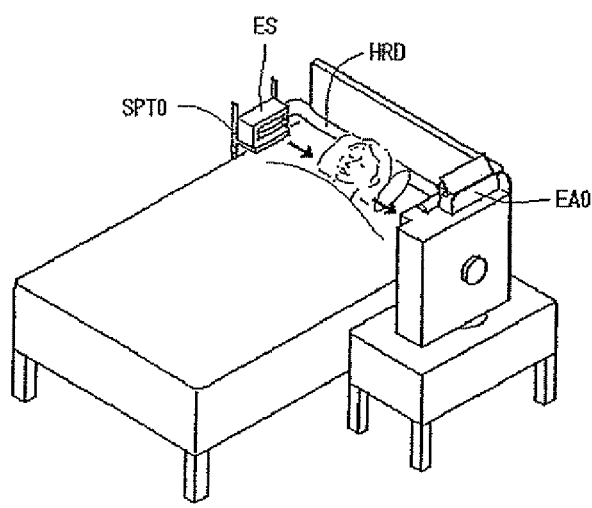
Figure 38B:
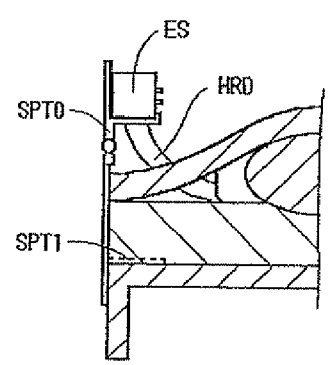
Figure 39A:
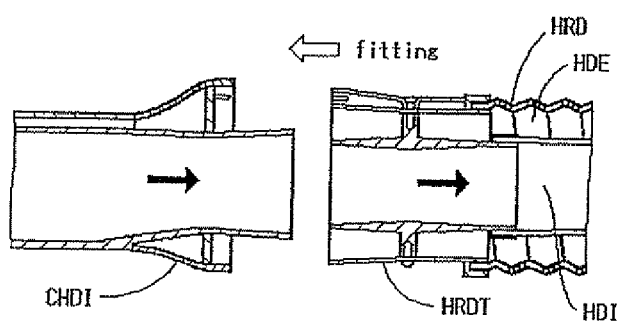
Figure 39B:
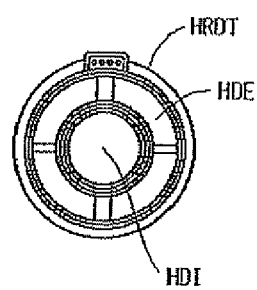
Figure 40A:
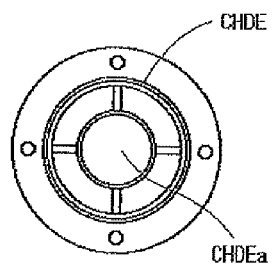
Figure 40B:
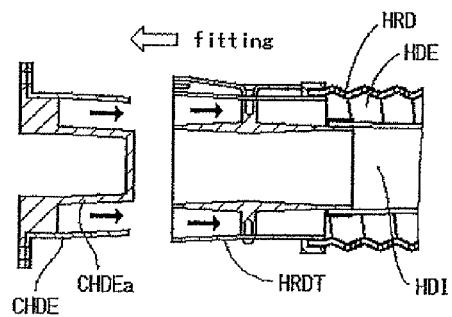

FIG. 35 is an isometric view of an inertial separator adapter IAHD, a hose HRD, and a third allergen suction device SA3D with a hose connection part CHDI, in the second hybrid air cleaner. FIG. 36(a) is an isometric view of a blowing mouth adapter EA0. FIG. 36(b) is a side elevation view of the blowing mouth adapter EA0. FIG. 37 is an isometric view of a separate blowing mouth ES. FIG. 38(a) is an illustration where the separate blowing mouth ES of the second hybrid air cleaner is used while a patient is sleeping. FIG. 38(b) is a fragmentary vertical cross-sectional view of FIG. 38(a). FIG. 39(a) is a vertical cross-sectional view showing a state where the hose connection part CHDI is being fitted to a terminal part HRDT of the hose HRD. FIG. 39(b) is an elevation view of the terminal part HRDT. FIG. 40(a) is an elevation view of a hose connection part CHDE for blowing air. FIG. 40(b) is a vertical cross-sectional view showing a state where the hose connection part CHDE for blowing air is being fitted to the terminal part HRDT.

The second hybrid air cleaner has the same main body as the first hybrid air cleaner, shown in FIG. 1. Further, for example shown in FIG. 35, the second hybrid air cleaner is removably provided with the third allergen suction device SA3D, the inertial separator adapter IAHD and the hose HRD. Each of the third allergen suction device SA3D and the inertial separator adapter IAHD has the hose connection part CHDI. Further, the second hybrid air cleaner is removably provided with the separate blowing mouth ES via the blowing mouth adapter EA0 and the hose HRD.

The hose HRD has a suction air path HDI inside and a blowing air path HDE outside (FIG. 39(a), FIG. 39(b)). When the third allergen suction device SA3D is used, the hose connection part CHDI at an end of the third allergen suction device SA3D is fitted to the terminal part HRDT of the hose HRD and only the suction air path HDI is used (FIG. 39(a), FIG. 39(b)). The inertial separator adapter IAHD is also connected with the hose HRD in the same way.

When the separate blowing mouth ES is used, it is connected to the hose HRD with the blowing mouth adapter EA0. The blowing mouth adapter EA0 is attached to a blowing mouth F12 of the main body of the hybrid air cleaner (FIG. 1), and they are used in a configuration where the patient's head is between them (FIG. 38(a)). A cup-shaped projection CHDEa is formed in the hose connection part CHDE for blowing air, which is a connection part of the separate blowing mouth ES or the blowing mouth adapter EA0 (FIG. 36(a), FIG. 36(b), FIG. 37, FIG. 40(a), FIG. 40(b)). The cup-shaped projection CHDEa fills the suction air path HDI of the terminal part HRDT of the hose HRD and only the blowing air path HDE is used. Further, the connection part of the hose may be provided with a hook used in a fitting connection of a vacuum cleaner and so on to increase stability.

The blowing mouth adapter EA0 can be made to blow in both directions by a blade EA1 used for blowing direction control, and the second hybrid air cleaner can be placed on a right or left side of a patient (FIG. 36(a), FIG. 36(b), FIG. 38(a)). Further, a ratio of a flow rate of the air flow blowing from the blowing mouth adapter EA0 to the air flow blowing from the separate blowing mouth ES is controlled by an angle of the blade EA1.

Furthermore, the separate blowing mouth ES can be provided with a heater and discharge warm air in winter to warm the skin, though dry air induces nasal congestion in some cases.

In addition, when the separate blowing mouth ES is used in a bed, it is held by a side table or a support SPT0. A plate SPT1 is at an under part of the support SPT0 and is inserted between a bed support and the mattress (FIG. 38(a), FIG. 38(b)).

When the patient of perennial allergic rhinitis uses the second hybrid air cleaner, first, the allergen existing in bedding can be sucked and removed by the allergen suction device, and secondly, the suspended allergen is effectively transferred and removed by the separate blowing mouth, which enormously reduces the amount of allergen exposure during the patient's sleep.

What is claimed is:

1. An inertial separator comprising(a) a main duct having a first half and a latter half, the first half, having a positive curvature and a spanwise channel width larger than a radial channel width, the latter half, having a similar aspect ratio and a mean curvature larger than the first half with an outer wall part removed,(b) part for sucking a boundary layer formed on a side of a removed part of an outside wall of the latter half,(c) a final collection part succeeding the part for sucking the boundary layer, the final collection part having an inlet duct, an outlet duct and a curved duct formed between the inlet duct and the outlet duct, the curved duct having a larger mean curvature and a smaller radial channel width than the latter half of the main duct, with an outside wall part removed, and(d) a collection chamber part formed on a side of a removed part of an outside wall of the curved duct of the final collection part; and wherein two ducts succeeding the latter half of the main duct and the outlet duct of the final collection part are connected.

2. The inertial separator of claim 1, wherein(a) a portion of a wall of an upper part of the collection chamber part is formed by a plate for preventing re-scatter externally connected to a driving plate made of ferromagnetic material,(b) the plate for preventing re-scatter closing the upper part of the collection chamber part while inertial collection is not performed, and(c) the plate for preventing re-scatter opening the upper part of the collection chamber part with an electromagnet for preventing re-scatter attracting the driving plate while inertial collection is performed.

3. The inertial separator of claim 1, wherein an initial collection mouth is opened at an initial part of a curve of an outside wall of the first half of the main duct and a part with an initial collection chamber is formed connecting to the initial collection mouth.

4. The inertial separator of claim 3, wherein(a) an upper part of the part with the initial collection chamber is equipped with a plate for preventing initial re-scatter which is externally connected to a driving plate of initial collection made of ferromagnetic material,(b) a portion of a wall of an upper part of the collection chamber part is formed by a plate for preventing re-scatter externally connecting with a driving plate made of ferromagnetic material,(c) the plate for preventing initial re-scatter and the plate for preventing re-scatter closing the upper part of the part with the initial collection chamber and the upper part of the collection chamber part, respectively, while inertial collection is not performed, and(d) the plate for preventing initial re-scatter and the plate for preventing re-scatter opening the upper part of the part with the initial collection chamber and the upper part of the collection chamber part, respectively, with an electromagnet for preventing initial re-scatter and an electromagnet for preventing re-scatter attracting the driving plate of initial collection and the driving plate, respectively, while inertial collection is performed.

5. A hybrid air cleaner, comprising(a) a filter collection part having a pre-filter, a filter medium and a deodorizing filter,(b) a centrifugal fan behind the filter collection part,(c) a suction control part before the filter collection part, with a suction plate and a plate for adjusting a plurality of suction holes, the suction plate and the plate for adjusting the suction holes, both of which, having suction holes, enabling air flow to pass or stop by relatively shifting,(d) the inertial separator of claim 1 with a plate for opening and closing of an inlet,(e) a connection part for the inertial separator, connecting an outlet of the inertial separator with a space formed between the filter collection part and the suction control part,(f) a hose having a suction air path, and(g) an allergen suction device having a wide suction mouth on a body of the device and a hose connection part at an end of the allergen suction device, the allergen suction device being removably attached to the inertial separator via the hose and an inertial separator adapter including the hose connection part.

6. The hybrid air cleaner of claim 5, wherein the allergen suction device further comprises (a) a vibrating brush with a brush plate having a plurality of suction holes, (b) a flow path bulkhead separating the wide suction mouth and the vibrating brush, (c) a driving motor supported on a upper plate of the body of the device, arranged to vibrate the vibrating brush lengthwise, (d) a plurality of suction holes in a vibrating brush side, and (e) a plate for flow path change, at a lower part of the flow path bulkhead.

7. The hybrid air cleaner of claim 5, wherein the allergen suction device further comprises (a) a vibrating brush with a brush plate having a plurality of suction holes of a brush plate, (b) a rotating brush in the wide suction mouth, (c) a flow path bulkhead separating the wide suction mouth and the vibrating brush, (d) a claw for a suction mode of the vibrating brush, a claw for a suction mode of the rotating brush and a claw stopper, the two claws, formed on an edge of an upper body of device being able to slide, either of which is fixed by the claw stopper, to enable selection of one of the two suction modes correspondingly, (e) a driving motor contained in the upper body of device, the driving motor connected to and rotating the rotating brush about an axis or vibrating the vibrating brush lengthwise, according to selection of one of the two suction modes, (f) a switch arranged to detect a position of the claw stopper, the switch detecting the claw stopper moving downwards in a change mode, which causes the driving motor to be driven in low torque and the suction mode to be smoothly changed, (g) a plurality of suction holes in a vibrating brush side, and (h) a plate for flow path change disposed at a lower part of the flow path bulkhead.

8. The hybrid air cleaner of claim 5, wherein the allergen suction device further comprises (a) an outer body of the device having a plurality of suction mouths on the outer body of the device, the outer body including a cover which is slidable to open and close the suction mouths of the outer body, (b) an inner body of the device supported by the outer body of the device, between which inner and outer body a flow path is defined for suction air sucked from the suction mouths of the outer body, (c) a driving motor in the inner body and one or two beating members projecting from a base of the inner body, the one or two beating members reciprocated by the driving motor, and (d) an adapter for a quilt, the adapter having a plurality of meshlike suction mouths and being removably attached.

9. The hybrid air cleaner of claim 5, wherein
  (a) the hose further comprises a blowing air path and
  (b) the hose connection part fits with the hose and makes only the suction air path available; and further comprising:
  (c) a blowing mouth adapter having a hose connection part for blowing air and a blade for blowing direction control, the hose connection part for blowing air, fitting with the hose, stopping the suction air path and making only the blowing air path available, the blade for blowing direction control enabling direction control of air blowing through the mouth, and
  (d) a separate blowing mouth including the hose connection part for blowing air, the separate blowing mouth, removably attached to a main body of the hybrid air cleaner via the hose and the blowing mouth adapter;
and wherein
  (e) the centrifugal fan is arranged to be intermittently operated while the separate blowing mouth is being used.

10. The hybrid air cleaner of claim 6, wherein
  (a) the hose further comprises a blowing air path and
  (b) the hose connection part fits with the hose and makes only the suction air path available;
and further comprising;
  (c) a blowing mouth adapter having a hose connection part for blowing air and a blade for blowing direction control, the hose connection part for blowing air, fitting with the hose, stopping the suction air path and making only the blowing air path available, the blade for blowing direction control enabling direction control of air blowing through the mouth, and
  (d) a separate blowing mouth including the hose connection part for blowing air, the separate blowing mouth, removably attached to a main body of the hybrid air cleaner via the hose and the blowing mouth adapter;
and wherein
  (e) the centrifugal fan is arranged to be intermittently operated while the separate blowing mouth is being used.

11. The hybrid air cleaner of claim 7, wherein
  (a) the hose further comprises a blowing air path and
  (b) the hose connection part fits with the hose and makes only the suction air path available;
and further comprising;
  (c) a blowing mouth adapter having a hose connection part for blowing air and a blade for blowing direction control, the hose connection part for blowing air, fitting with the hose, stopping the suction air path and making only the blowing air path available, the blade for blowing direction control enabling direction control of air blowing through the mouth, and
  (d) a separate blowing mouth including the hose connection part for blowing air, the separate blowing mouth, removably attached to a main body of the hybrid air cleaner via the hose and the blowing mouth adapter;
and wherein
  (e) the centrifugal fan is arranged to be intermittently operated while the separate blowing mouth is being used.

12. The hybrid air cleaner of claim 8, wherein
  (a) the hose further comprises a blowing air path and
  (b) the hose connection part fits with the hose and makes only the suction air path available;
and further comprising;
  (c) a blowing mouth adapter having a hose connection part for blowing air and a blade for blowing direction control, the hose connection part for blowing air, fitting with the hose, stopping the suction air path and making only the blowing air path available, the blade for blowing direction control enabling direction control of air blowing through the mouth, and
  (d) a separate blowing mouth including the hose connection part for blowing air, the separate blowing mouth, removably attached to a main body of the hybrid air cleaner via the hose and the blowing mouth adapter;
and wherein
  (e) the centrifugal fan is arranged to be intermittently operable while the separate blowing mouth is being used.

* * * * *